US008915740B2

(12) United States Patent
Zboray et al.

(10) Patent No.: US 8,915,740 B2
(45) Date of Patent: Dec. 23, 2014

(54) VIRTUAL REALITY PIPE WELDING SIMULATOR

(75) Inventors: David Anthony Zboray, Trumbull, CT (US); Matthew Alan Bennett, Milford, CT (US); Matthew Wayne Wallace, Farmington, CT (US); Jeremiah Hennessey, Manchester, CT (US); Yvette Christine Dudac, Southington, CT (US); Zachary Steven Lenker, Vernon, CT (US); Andrew Paul Lundell, New Britain, CT (US); Paul Dana, East Lyme, CT (US); Eric A. Preisz, Orlando, FL (US); Lynn Briggs, Bristol, CT (US); Richard B. Droller, New Hartford, CT (US); Eric C. Briggs, Bristol, CT (US)

(73) Assignee: Lincoln Global, Inc., City of Industry, CA (US)

( * ) Notice: Subject to any disclaimer, the term of this patent is extended or adjusted under 35 U.S.C. 154(b) by 797 days.

(21) Appl. No.: 12/501,263

(22) Filed: Jul. 10, 2009

(65) Prior Publication Data
US 2010/0062406 A1 Mar. 11, 2010

Related U.S. Application Data

(60) Provisional application No. 61/090,794, filed on Aug. 21, 2008.

(51) Int. Cl.
*G09B 19/24* (2006.01)
(52) U.S. Cl.
USPC ............... 434/234; 156/64; 434/260; 219/75; 219/124; 219/158; 219/159; 219/74; 219/124.34; 228/176

(58) Field of Classification Search
USPC ............... 156/64; 434/234, 260; 219/75, 124, 219/158, 159, 74, 124.34; 228/176
See application file for complete search history.

(56) References Cited

U.S. PATENT DOCUMENTS 3,555,239 A * 1/1971 Kerth .................... 219/124.34
3,866,011 A 2/1975 Cole
(Continued)

FOREIGN PATENT DOCUMENTS

DE 28 33 638 A1 2/1980
DE 30 46 634 A1 7/1982
(Continued)

OTHER PUBLICATIONS

Code Aster (Software) EDF (France), Oct. 2001.*
(Continued)

*Primary Examiner* — Nikolai A Gishnock
*Assistant Examiner* — Randall N Crenwelge
(74) *Attorney, Agent, or Firm* — Hahn Loeser & Parks LLP

(57) ABSTRACT

A simulator facilitates virtual welding activity of pipe and open root weld joints. The simulator may include a logic processor based system operable to execute coded instructions for generating an interactive welding environment that emulates welding activity on a section of virtual pipe having at least one virtual weld joint. It also includes a display connected to the logic processor based system for visually depicting the interactive welding environment, wherein the display depicts the section of virtual pipe. A mock welding tool is provided for performing virtual welding activity on the at least one weld joint in real time where one or more sensors are adapted to track movement of the input device in real time for communicating data about the movement of the input device to the logic processor based system.

51 Claims, 22 Drawing Sheets

(56) References Cited

U.S. PATENT DOCUMENTS

| | | | |
|---|---|---|---|
| 3,867,769 A * | 2/1975 | Schow et al. | 434/234 |
| 3,904,845 A * | 9/1975 | Minkiewicz | 228/176 |
| 3,988,913 A | 11/1976 | Metcalfe et al. | |
| 4,041,615 A | 8/1977 | Whitehill | |
| 4,124,944 A | 11/1978 | Blair | |
| 4,132,014 A | 1/1979 | Schow | |
| 4,359,622 A | 11/1982 | Dostoomian et al. | |
| 4,410,787 A | 10/1983 | Kremers et al. | |
| 4,429,266 A | 1/1984 | Tradt | |
| 4,452,589 A | 6/1984 | Denison | |
| 4,611,111 A | 9/1986 | Baheti et al. | |
| 4,616,326 A | 10/1986 | Meier et al. | |
| 4,629,860 A | 12/1986 | Lindbom | |
| 4,677,277 A | 6/1987 | Cook et al. | |
| 4,680,014 A | 7/1987 | Paton et al. | |
| 4,689,021 A | 8/1987 | Vasiliev et al. | |
| 4,707,582 A | 11/1987 | Beyer | |
| 4,716,273 A | 12/1987 | Paton et al. | |
| 4,867,685 A * | 9/1989 | Brush et al. | 434/234 |
| 4,897,521 A | 1/1990 | Burr | |
| 4,907,973 A | 3/1990 | Hon | |
| 4,931,018 A | 6/1990 | Herbst et al. | |
| 4,998,050 A | 3/1991 | Nishiyama et al. | |
| 5,034,593 A | 7/1991 | Rice et al. | |
| 5,061,841 A | 10/1991 | Richardson | |
| 5,285,916 A | 2/1994 | Ross | |
| 5,305,183 A | 4/1994 | Teynor | |
| 5,320,538 A | 6/1994 | Baum | |
| 5,436,638 A | 7/1995 | Bolas et al. | |
| 5,464,957 A | 11/1995 | Kidwell et al. | |
| 5,562,843 A | 10/1996 | Yasumoto | |
| 5,670,071 A | 9/1997 | Ueyama et al. | |
| 5,710,405 A | 1/1998 | Solomon et al. | |
| 5,719,369 A | 2/1998 | White et al. | |
| 5,728,991 A | 3/1998 | Takada et al. | |
| D395,296 S | 6/1998 | Kaye et al. | |
| 5,823,785 A | 10/1998 | Matherne, Jr. | |
| 5,835,077 A | 11/1998 | Dao et al. | |
| 5,845,053 A | 12/1998 | Watanabe et al. | |
| 5,963,891 A | 10/1999 | Walker et al. | |
| 6,114,645 A | 9/2000 | Burgess | |
| 6,155,928 A | 12/2000 | Burdick | |
| 6,230,327 B1 | 5/2001 | Briand | |
| 6,236,013 B1 | 5/2001 | Delzenne | |
| 6,242,711 B1 | 6/2001 | Cooper | |
| 6,330,966 B1 | 12/2001 | Eissfeller | |
| 6,331,848 B1 | 12/2001 | Stove et al. | |
| 6,373,465 B2 | 4/2002 | Jolly et al. | |
| 6,506,997 B2 | 1/2003 | Matsuyama | |
| 6,563,489 B1 | 5/2003 | Latypov et al. | |
| 6,572,379 B1 | 6/2003 | Sears et al. | |
| 6,647,288 B2 | 11/2003 | Madill et al. | |
| 6,708,385 B1 | 3/2004 | Lemelson | |
| 6,730,875 B2 * | 5/2004 | Hsu | 219/137 PS |
| 6,750,428 B2 | 6/2004 | Okamoto et al. | |
| 6,798,974 B1 | 9/2004 | Nakano et al. | |
| 6,865,926 B2 | 3/2005 | O'Brien et al. | |
| 7,021,937 B2 | 4/2006 | Simpson et al. | |
| 7,126,078 B2 | 10/2006 | Demers et al. | |
| 7,381,923 B2 | 6/2008 | Gordon et al. | |
| 7,414,595 B1 | 8/2008 | Muffler | |
| 7,465,230 B2 * | 12/2008 | LeMay et al. | 463/32 |
| 7,478,108 B2 | 1/2009 | Townsend et al. | |
| 7,621,171 B2 | 11/2009 | O'Brien | |
| 7,817,162 B2 | 10/2010 | Bolick et al. | |
| 7,853,645 B2 | 12/2010 | Brown et al. | |
| 7,970,172 B1 | 6/2011 | Hendrickson | |
| 7,972,129 B2 | 7/2011 | O'Donoghue | |
| 8,224,881 B1 | 7/2012 | Spear et al. | |
| 8,248,324 B2 | 8/2012 | Nangle | |
| 8,287,522 B2 | 10/2012 | Moses et al. | |
| 8,316,462 B2 | 11/2012 | Becker et al. | |
| 8,569,646 B2 | 10/2013 | Daniel et al. | |
| 8,777,629 B2 | 7/2014 | Kreindl et al. | |
| 2001/0045808 A1 | 11/2001 | Hietmann et al. | |
| 2001/0052893 A1 | 12/2001 | Jolly et al. | |
| 2002/0032553 A1 | 3/2002 | Simpson et al. | |
| 2002/0046999 A1 | 4/2002 | Veikkolainen | |
| 2002/0050984 A1 | 5/2002 | Roberts | |
| 2002/0175897 A1 | 11/2002 | Pelosi | |
| 2003/0000931 A1 | 1/2003 | Ueda et al. | |
| 2003/0023592 A1 | 1/2003 | Modica et al. | |
| 2003/0025884 A1 | 2/2003 | Hamana et al. | |
| 2003/0106787 A1 | 6/2003 | Santilli | |
| 2003/0172032 A1 | 9/2003 | Choquet | |
| 2003/0234885 A1 | 12/2003 | Pilu | |
| 2004/0020907 A1 | 2/2004 | Zauner et al. | |
| 2005/0046584 A1 | 3/2005 | Breed | |
| 2005/0101767 A1 | 5/2005 | Clapham et al. | |
| 2005/0103766 A1 | 5/2005 | Iizuka et al. | |
| 2005/0109735 A1 * | 5/2005 | Flood | 219/75 |
| 2005/0128186 A1 | 6/2005 | Shahoian et al. | |
| 2005/0159840 A1 | 7/2005 | Lin et al. | |
| 2005/0275913 A1 | 12/2005 | Vesely et al. | |
| 2005/0275914 A1 | 12/2005 | Vesely et al. | |
| 2006/0136183 A1 | 6/2006 | Choquet | |
| 2006/0189260 A1 | 8/2006 | Sung | |
| 2006/0214924 A1 | 9/2006 | Kawamoto et al. | |
| 2006/0226137 A1 | 10/2006 | Huismann et al. | |
| 2006/0252543 A1 | 11/2006 | Van Noland et al. | |
| 2006/0258447 A1 | 11/2006 | Baszucki et al. | |
| 2007/0112889 A1 | 5/2007 | Cook et al. | |
| 2007/0198117 A1 | 8/2007 | Wajihuddin | |
| 2008/0031774 A1 | 2/2008 | Magnant et al. | |
| 2008/0038702 A1 * | 2/2008 | Choquet | 434/260 |
| 2008/0233550 A1 | 9/2008 | Solomon | |
| 2008/0314887 A1 | 12/2008 | Stoger et al. | |
| 2009/0021514 A1 | 1/2009 | Klusza | |
| 2009/0045183 A1 | 2/2009 | Artelsmair et al. | |
| 2009/0057286 A1 | 3/2009 | Ihara et al. | |
| 2009/0231423 A1 | 9/2009 | Becker et al. | |
| 2009/0259444 A1 | 10/2009 | Dolansky et al. | |
| 2009/0298024 A1 * | 12/2009 | Batzler et al. | 434/234 |
| 2009/0325699 A1 | 12/2009 | Delgiannidis | |
| 2010/0012017 A1 | 1/2010 | Miller | |
| 2010/0062405 A1 | 3/2010 | Zboray et al. | |
| 2010/0062406 A1 | 3/2010 | Zboray et al. | |
| 2010/0121472 A1 | 5/2010 | Babu et al. | |
| 2010/0201803 A1 | 8/2010 | Melikian | |
| 2010/0276396 A1 * | 11/2010 | Cooper et al. | 219/74 |
| 2010/0299101 A1 | 11/2010 | Shimada et al. | |
| 2011/0006047 A1 | 1/2011 | Penrod et al. | |
| 2011/0091846 A1 | 4/2011 | Kreindl et al. | |
| 2011/0116076 A1 | 5/2011 | Chantry et al. | |
| 2011/0117527 A1 | 5/2011 | Conrardy et al. | |
| 2011/0122495 A1 | 5/2011 | Togashi | |
| 2011/0183304 A1 * | 7/2011 | Wallace et al. | 434/234 |
| 2011/0248864 A1 | 10/2011 | Becker et al. | |
| 2011/0316516 A1 | 12/2011 | Schiefermuller et al. | |
| 2012/0291172 A1 | 11/2012 | Wills et al. | |
| 2013/0026150 A1 | 1/2013 | Chantry et al. | |
| 2013/0040270 A1 | 2/2013 | Albrecht | |

FOREIGN PATENT DOCUMENTS

| | | |
|---|---|---|
| DE | 32 44 307 A1 | 5/1984 |
| DE | 35 22 581 A1 | 1/1987 |
| DE | 196 15 069 A1 | 10/1997 |
| DE | 197 39 720 C1 | 10/1998 |
| DE | 200 09 543 U1 | 8/2001 |
| DE | 10 2005 047 204 A1 | 4/2007 |
| DE | 10 2010 038 902 A1 | 2/2012 |
| EP | 0 108 599 A1 | 5/1984 |
| EP | 0 145 891 A1 | 6/1985 |
| EP | 0852986 A1 | 7/1998 |
| EP | 1 527 852 A1 | 5/2005 |
| ES | 2 274 736 A1 | 5/2007 |
| ES | 2274736 A1 | 5/2007 |
| FR | 1456780 | 3/1965 |
| FR | 2827066 A1 | 1/2003 |
| FR | 2926660 A1 | 7/2009 |
| GB | 1 455 972 | 11/1976 |
| GB | 1 511 608 | 5/1978 |
| GB | 2 254 172 A | 9/1992 |

(56) References Cited

FOREIGN PATENT DOCUMENTS

| | | | |
|---|---|---|---|
| GB | 2435838 | A | 9/2007 |
| GB | 2 454 232 | A | 5/2009 |
| JP | 05-329645 | A | 12/1993 |
| JP | 07-047471 | A | 2/1995 |
| JP | 07-232270 | A | 9/1995 |
| JP | 08-132274 | A | 5/1996 |
| JP | 08-150476 | A | 6/1996 |
| JP | 08-505091 | A | 6/1996 |
| JP | 2000-167666 | A | 6/2000 |
| JP | 2001-071140 | A | 3/2001 |
| JP | 2003-200372 | A | 7/2003 |
| JP | 2003-326362 | A | 11/2003 |
| JP | 2006-281270 | A | 10/2006 |
| JP | 2007-290025 | A | 11/2007 |
| JP | 2009-500178 | A | 1/2009 |
| RU | 2008 108 601 | A | 11/2009 |
| SU | 1038963 | A1 | 8/1983 |
| WO | 2006/034571 | | 4/2006 |
| WO | 2007039278 | A1 | 4/2007 |
| WO | 2009149740 | A1 | 12/2009 |
| WO | 2010/000003 | A2 | 1/2010 |
| WO | 2011/067447 | A1 | 6/2011 |
| WO | 2011097035 | A2 | 8/2011 |

OTHER PUBLICATIONS

ASME Definitions, Consumables, Welding Positions, dated Mar. 19, 2001. See: http://www.gowelding.com/wp/asme4.htm.*

"Penetration in Spot GTA Welds during Centrifugation," D.K. Aidun and S.A. Martin; Journal of Materials Engineering and Performance vol. 7(5) Oct. 1998—597.*

Mechanisms and Mechanical Devices Source Book, Chironis, Neil Sclater; McGraw Hill; 2nd Additon, 1996.*

"Numerical simulation to study the effect of tack welds and root gap on welding deformations and residual stresses of a pipe-flange joint" by M. Abida and M. Siddique, Faculty of Mechanical Engineering, GIK Institute of Engineering Sciences and Technology, Topi, NWFP, Pakistan. Available on-line Aug. 24, 2005.*

16TH International Ship and Offshore Structures Congress: Aug. 20-25, 2006: Southampton, UK, vol. 2 Specialist Committee V.3 Fabrication Technology Committee Mandate: T Borzecki, G. Bruce, Y.S. Han, M. Heinemann, A Imakita, L. Josefson, W. Nie, D. Olson, F. Roland, and Y. Takeda.*

"The Influence of fluid flow phenomena on the laser beam welding process"; International Journal of Heat and Fluid Flow 23, dated 2002.*

"Numerical Analysis of Metal Transfer in Gas Metal Arc Welding," G. Wang, P.G. Huang, and Y.M. Zhang, Departments of Mechannical and Electrical Engineering, University of Kentucky, Dec. 10, 2001.*

"Design and Implementation of a Video Sensor for Closed Loop Control of Back Bead Weld Puddle Width," Robert Schoder, Massachusetts Institute of Technology, Dept. of Mechanical Engineering, May 27, 1983.* http://www.sciencedirect.com/science/article/pii/ S009457650000151X.*

Virtual Reality Welder Trainer, Session 5: Joining Technologies for Naval Applications: earliest date Jul. 14, 2006 (http://wayback. archive.org) by Nancy C. Porter, Edison Welding Institute; J. Allan Cote, General Dynamics Electric Boat; Timothy D. Gifford, VRSim; and Wim Lam, FCS Controls.*

B. Virtual Reality Welder Training, Session 5: Joining Technologies for Naval Applications: earliest date Jul. 14, 2006 (http://wayback. archive.org) by Nancy C. Porter, Edison Welding Institute; J. Allan Cote, General Dynamics Electric Boat; Timothy D. Gifford, VRSim; and Wim Lam, FCS Controls. See http://www.cs.cmu.edu/~fp/ courses/graphics/pdf-co.*

ASME Definitions, Consumables, Welding Positions, dated Mar. 19, 2001. See: http://www.gowelding_com/wp/asme4.htm.*

Mechanisms and Mechanical Devices Source Book, Chironis, Neil Sclater; McGraw Hill, 2nd edition,1996.*

"Numerical simulation to study the effect of tack welds and root gap on welding deformations and residual stresses of a pipe-flange joint" by M. Abida, and M. Siddique, Faculty of Mechanical Engineering, GIK Institute of Engineering Sciences and Technology, Topi, NWFP, Pakistan Available online Aug. 24, 2005.*

16th International Ship and Offshore Structures Congress Aug. 20-25, 2006 Southampton, UK vol. 2 Specialist Committee V.3 Fabrication Technology Committee Mandate. (Committee Members include: Chairman: T Borzecki, G Bruce, Ys Han, M Heinemann, A Imakita, L Josefson, W Nie, D Olson, F Roland, and Y Takeda).*

Achim Mahrle and Jurgen Schmidt: "The influence of fluid flow phenomena on the laser beam welding process" International Journal of Heat and Fluid Flow 23 (2002): Institute of Fluid Dynamics and Thermodynamics, Otto-von- Guericke University Magdeburg, P.O. Box 4120, D-39016 Magdeburg, Germany.*

ANSI/AWS D10.11M/D10.11:2007Guide for Root Pass Welding of Pipe Without Backing Edition: 3rd American Welding Society / Oct. 13, 2006 / 36 pages. ISBN: 0871716445.*

Achim Mahrle and Jurgen Schmidt: "The influence of fluid flow phenomena on the laser beam welding process"; International Journal of Heat and Fluid Flow 23 (2002): Institute of Fluid Dynamics and Thermodynamics, Otto-von- Guericke University Magdeburg, P.O. Box 4120, D-39016 Magdeburg, Germany.*

Numerical Analysis of Metal Transfer in Gas Metal Arc Welding: Departments of Mechanical Engineering; and Electrical and Computer Engineering, University of Kentucky, Lexington, KY 40506-0108, Dec. 10, 2001.*

Simulation of Tack Welding Procedures in Butt Joint Welding of Plates Tack Welding by M. Jonsson, L. Karlsson and L-E. Lindgren and Simulation of a Work Cell in the IGRIP Program, by Isaac Brana Veiga, dated 2006.*

Haptic Interfaces for Virtual Environment and Teleoperator Systems, 2003, Haptics 2003, by Balijepalli, A. and Kesavadas T. Department of Mechanical & Aerospace Engineering, State University of New York, Buffalo, NY, USA (Found in IEEE Xplore Digital Library).*

Application of Infrared Thermography to the Analysis of Welding processes by Janan Al-Karawi, and Jürgen Schmidt dated 2000.*

A Review of Welding Cast Steels and Its Effects on Fatigue and Toughness Properties by: John F. Wallace, Copy Write 1979.*

Hardware Accelerated Per-Pixel Displacement Mapping by Johannes Hirche WSI/GRIS University of Tübingen, Germany Alexander Ehlert, Stefan Guthe WSI/GRIS Michael Doggett ATI Research.*

Particle Systems Reference: William T. Reeves, "Particle Systems—A Technique for Modeling a Class of Fuzzy Objects", Computer Graphics 17:3 pp. 359-376, 1983 (SIGGRAPH 83).*

ANSI/A WS D 10.11M/D 10. 11:2007 Guide for Root Pass Welding of Pipe without Backing Edition: 34d American Welding Society/ Oct. 13, 2006/36 pages ISBN: 0871716445.*

Simulation of Tack Welding Procedures in Butt Joint Welding of Plates by M. Jonsson, L. Karlsson & L-E. Lindgren, Welding Research Supplement, Oct. 1985.*

Simulation of a Work Cell in the IGRIP Program by Isaac Brana Veiga, dated 2006.*

Haptic Interfaces for Virtual Environment and Teleoperator Systems, Haptics 2003 by Balijepalli, A. and Kesavadas 7-., Department of Mechanical & Aerospace Engineering, State University of New York at Buffalo, NY.*

Hardware Accelerated Per-Pixel Displacement Mapping by Johannes Hirche WSI/GRIS University of Tubingen, Germany, Alexander Ehlert, Stefan Guthe, WSt/GRfS & Michael Doggett, ATI Research.*

William T. Reeves, "Particles Systems—A Technique for Modeling a Class of Fuzzy Objects", Computer Graphics 17:3 pp. 359-376 1983.*

B. Virtual Reality Welder Training, Session 5: Joining Technologies for Naval Applications: earliest date Jul. 14, 2006 (http://wayback. archive.org) by Nancy C. Porter, Edison Welding Institute; J. Allan Cote, General Dynamics Electric Boat; Timothy D. Gifford, VRSim; and Wim Lam, FCS Controls.*

ASME Definitions, Consumables, Welding Positions, dated Mar. 19, 2001.*

(56) References Cited

OTHER PUBLICATIONS

D. K. Aidun and S.A. Martin, "Penetration in Spot GTA Welds during Centrifugation," Journal of Materials Engineering and Performance, vol. 7(5) Oct. 1998—597.*
Mechanisms and Mechanical Devices Source Book, Chironis, Neil Sclater; McGraw Hill, 2nd edition, 1996.*
Achim Mahrle and Jurgen Schmidt: "The influence of fluid flow phenomena on the laser beam welding process" International Journal of Heat and Fluid Flow 23 (2002): Institute of Fluid Dynamics and Thermodynamics, Otto-von-Guericke University Magdeburg, P.O. Box 4120, D-39016 Magdeburg, Germany.*
Schoder, Robert J. "Design and Implementation of a Video Sensor for Closed Loop Control of Back bead Weld Puddle Width." Department of Mechanical Engineering, Massachusetts Institute of Technology, May 27, 1983.*
T Borzecki, G Bruce, YS Han, and et al. "Fabrication Technology" 16th International Ship and Offshore Structures Congress Aug. 20-25, 2006 Southampton, UK vol. 2, Specialist Committee V.3 Fabrication Technology Committee Mandate.*
G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, Dec. 10, 2001.*
International Written Opinion for PCT/IB2009/00605.
International Search Report for PCT/IB2009/00605.
Juan Vicenete Rosell Gonzales, "RV-Sold: simulator virtual para la formacion de soldadores"; Deformacion Metalica, Es. vol. 34, No. 301, Jan. 1, 2008.
Choquet, Claude; "ARC+: Today's Virtual Reality Solution for Welders" Internet Page, Jan. 1, 2008.
Fast, K. et al., "Virtual Training for Welding", Mixed and Augmented Reality, 2004, ISMAR 2004, Third IEEE and CM International Symposium on Arlington, VA, Nov. 2-5, 2004.
U.S. Appl. No. 29/339,980, filed Jul. 10, 2009, issued May 11, 2010 as D615,573.
U.S. Appl. No. 29/339,979, filed Jul. 10, 2009, issued Apr. 20, 2010 as D614,217.
U.S. Appl. No. 29/339,978, filed Jul. 10, 2009.
U.S. Appl. No. 12/504,870, filed Jul. 17, 2009 claiming priority to U.S. Appl. No. 61/090,794.
U.S. Appl. No. 12/719,053, filed Mar. 8, 2010 claiming priority to U.S. Appl. No. 61/158,578.
U.S. Appl. No. 12/501,257, filed Jul. 10, 2009 claiming priority to U.S. Appl. No. 61/090,794.
White et al., Virtual welder trainer, 2009 IEEE Virtual Reality Conference, p. 303, 2009.
N. A. Tech., P/NA.3 Process Modelling and Optimization, 11 pages, Jun. 4, 2008.
FH Joanneum, Fronius—virtual welding, 2 pages, May 12, 2008.
ARC Simulation & Certification, Weld Into the Future, 6 pages, May 2008.
CS Wave, A Virtual learning tool for the welding motion, 10 pages, Mar. 14, 2008.
The Fabricator, Virtual Welding, 4 pages, Mar. 2008.
NSRP ASE , Low-Cost Virtual Reality Welder Training System, 1 page, 2008.
Edison Welding Institute, E-Weld Predictor, 3 pages, 2008.
CS Wave, The Virtual Welding Trainer, 6 pages, 2007.
Asciencetutor.com, A division of Advanced Science and Automation Corp., VWL (Virtual Welding Lab), 2 pages, 2007.
Mavrikios et al., A prototype virtual reality-based demonstrator for immersive and interactve simulation of welding processes, International Journal of Computer Integrated Manufacturing, vol. 19, Issue 3, Apr. 3, 2006, p. 294-300.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
Cooperative Research Program, Virtual Reality Welder Training, Summary Report SR0512, 4 pages, Jul. 2005.
Porter, et al., Virtual Reality Welder Training, Paper No. 2005-P19, 14 pages, 2005.
ARC Simulation & Certification, Weld Into the Future, 4 pages, 2005.
ARS Electronica Linz GMBH, Fronius, 2 pages, May 18, 1997.
SIMFOR / CESOL, "RV-Sold" Welding Simulator, Technical and Functional Features, 20 pages, no date available.
Chuansong Wu: "Microcomputer-based welder training simulator", Computers in Industry, vol. 20, No. 3, Oct. 1992, pp. 321-325, XP000205597, Elsevier Science Publishers, Amsterdam, NL.

\* cited by examiner

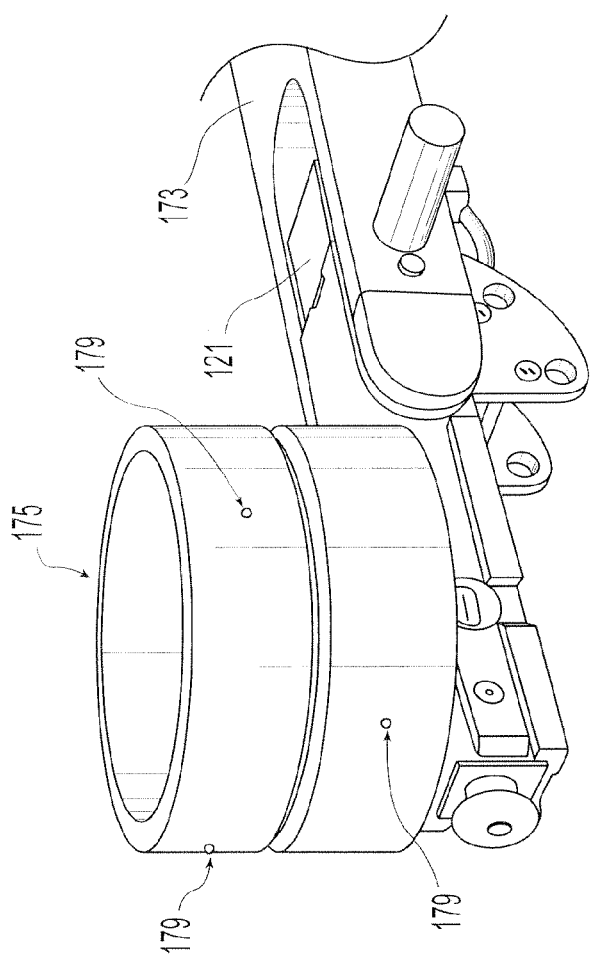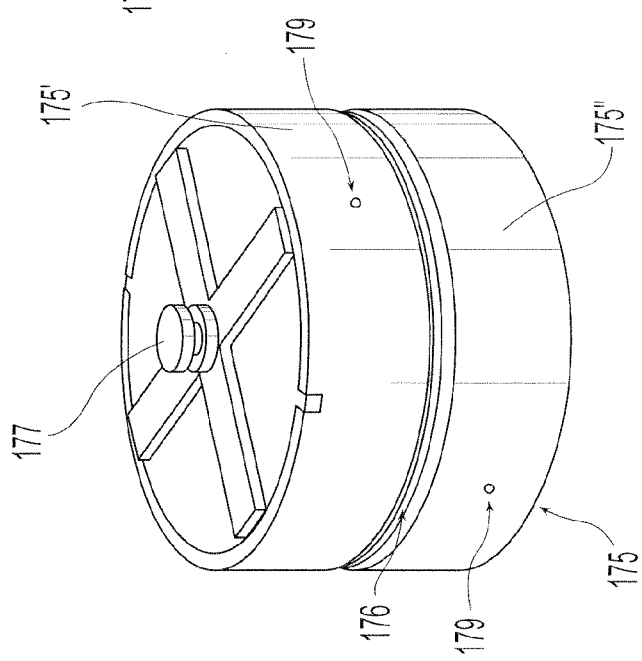

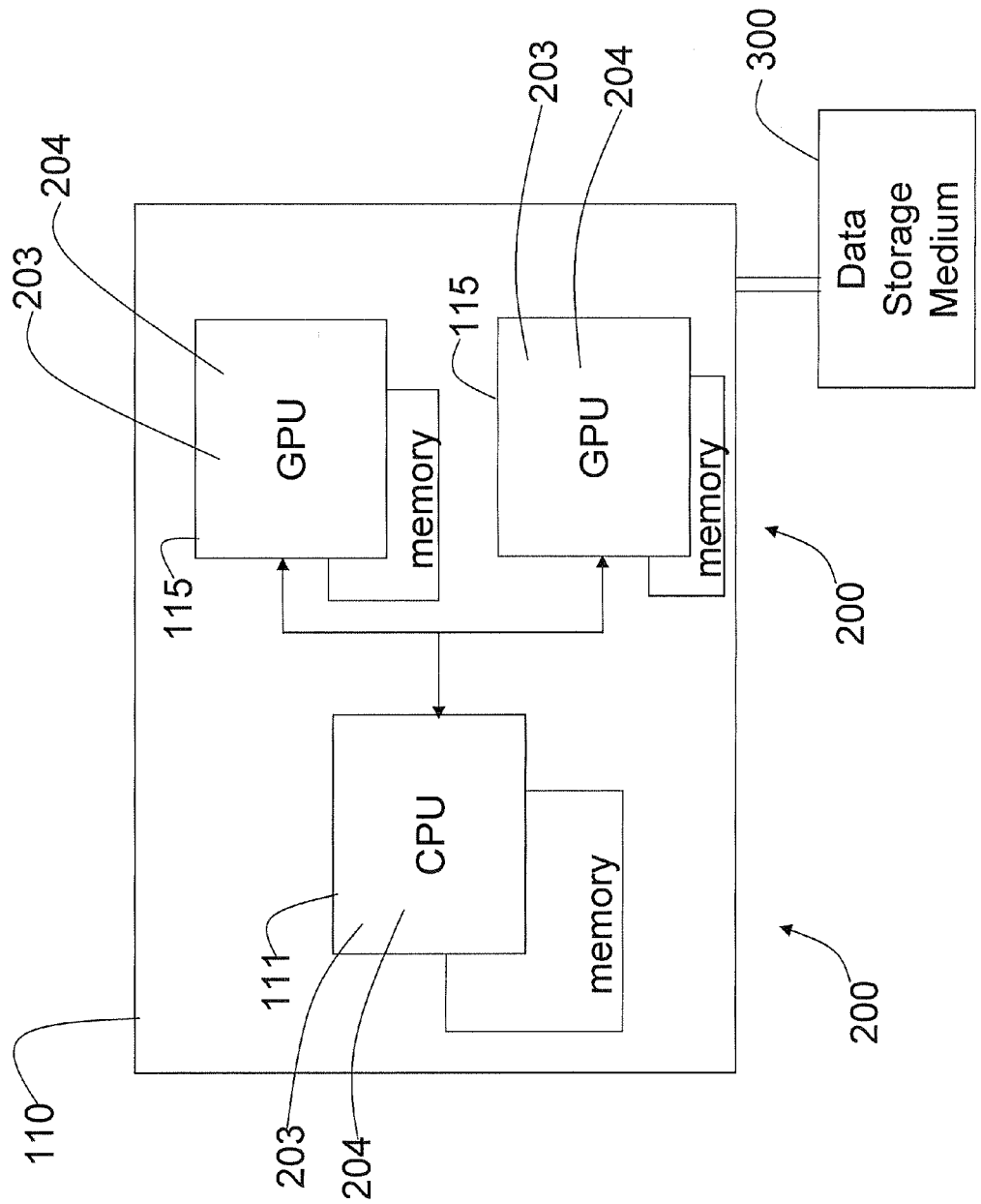

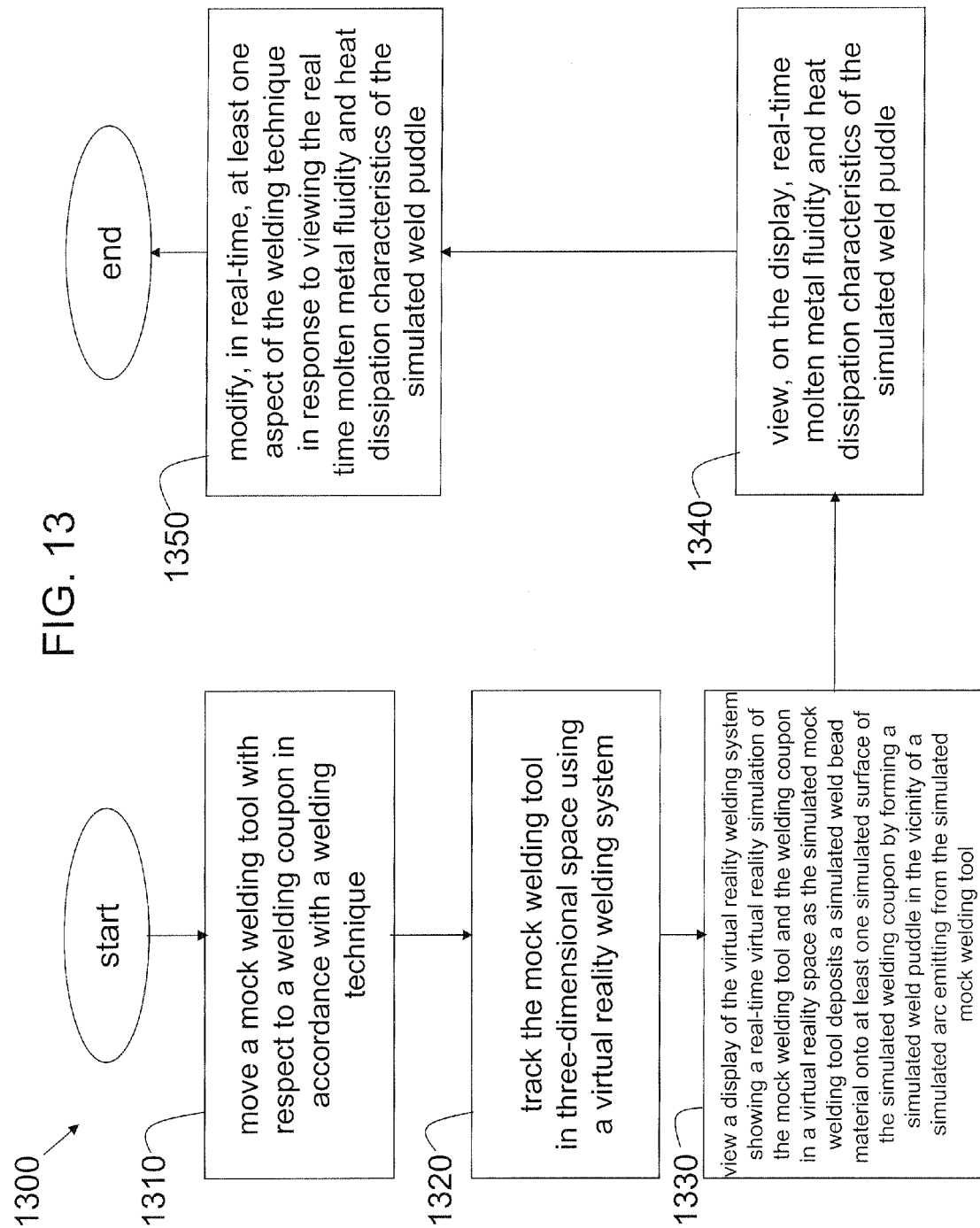

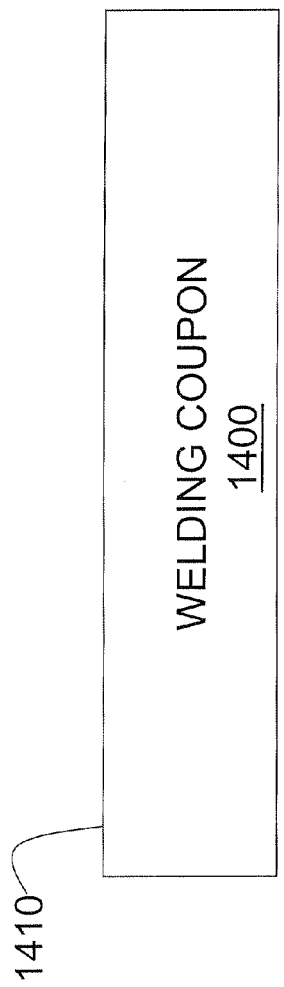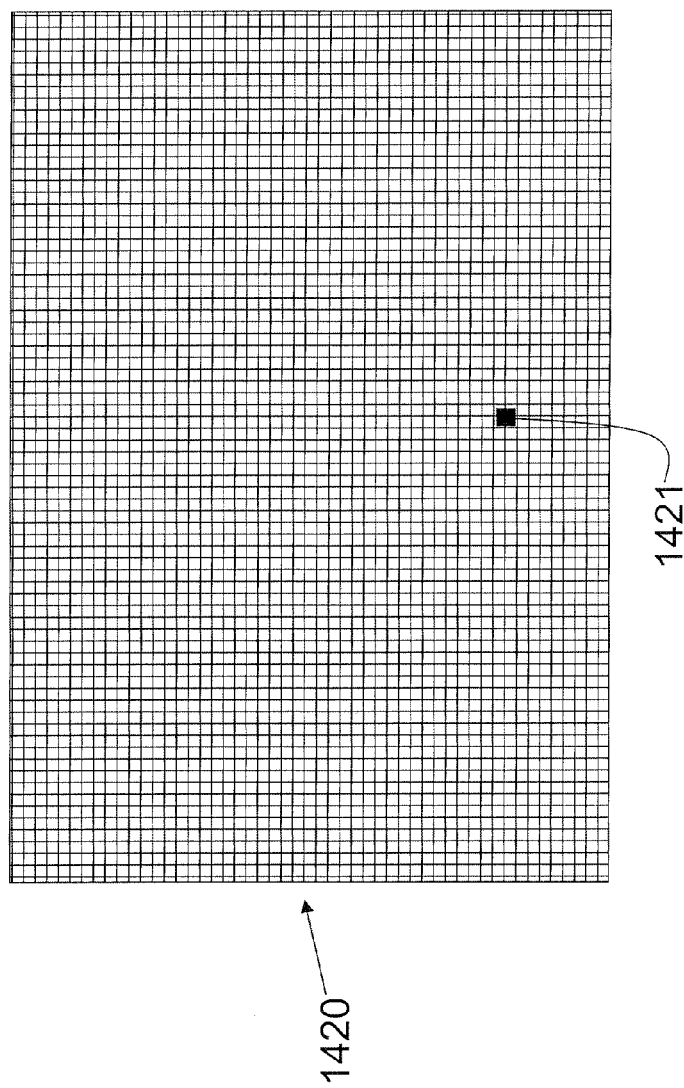

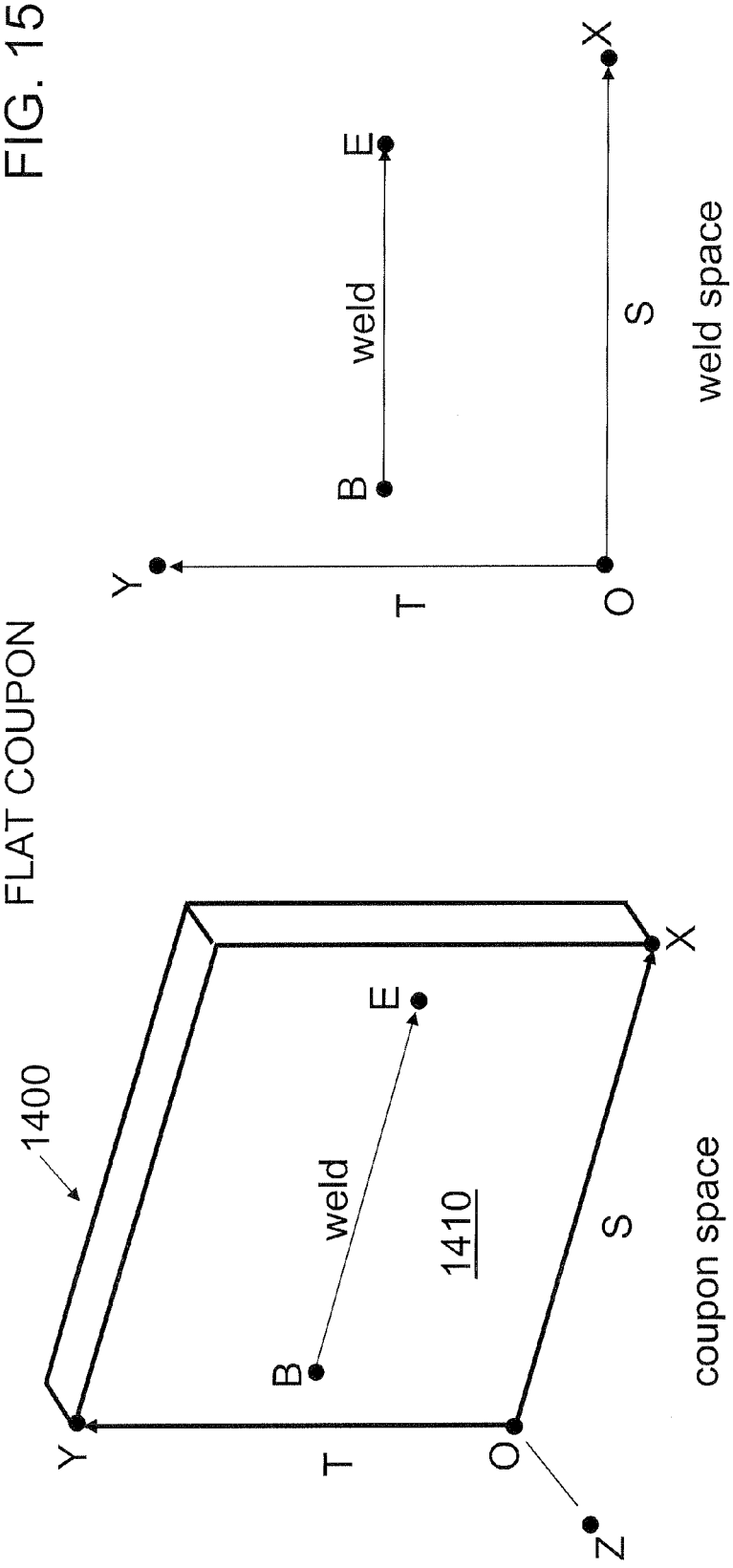

FIG. 17
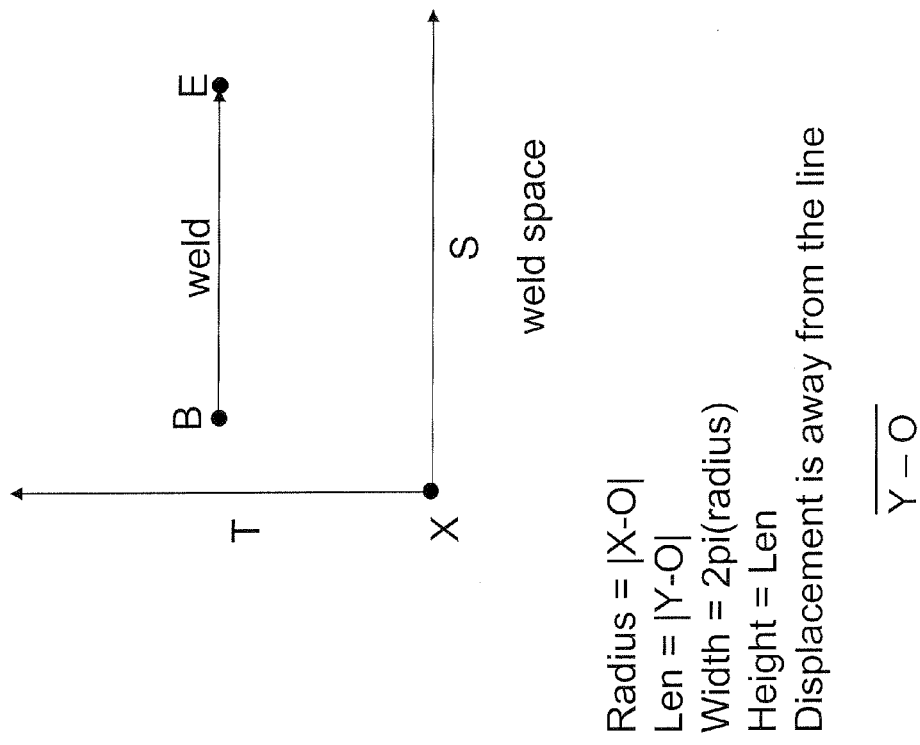
Radius = |X-O|
Len = |Y-O|
Width = 2pi(radius)
Height = Len
Displacement is away from the line
$\overline{Y-O}$
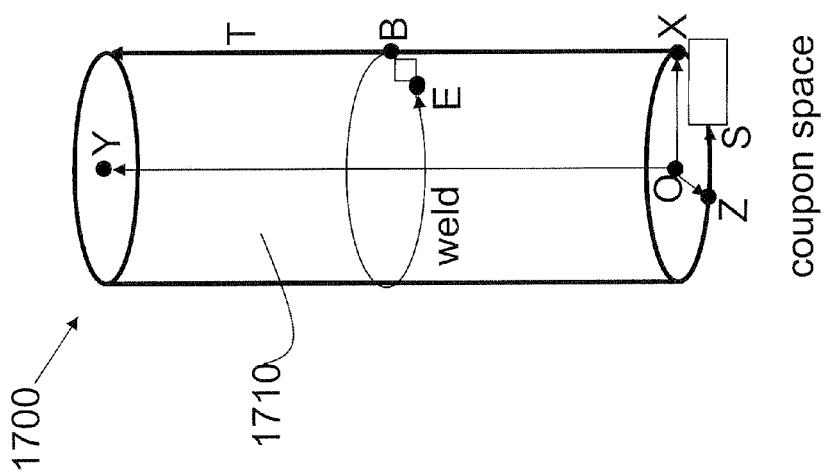

VIRTUAL REALITY PIPE WELDING SIMULATOR

This utility patent application claims priority to U.S. provisional patent application Ser. No. 61/090,794 filed on Aug. 21, 2008, which is incorporated herein by reference in its entirety.

TECHNICAL FIELD

The present invention pertains to systems for emulating a virtual welding environment, and more particularly to virtual welding environments that emulate the welding of pipe and open root joints in real time.

BACKGROUND OF THE INVENTION

For decades companies have been teaching welding skills Traditionally, welding has been taught in a real world setting, that is to say that welding has been taught by actually striking an arc with an electrode on a piece of metal. Instructors, skilled in the art, oversee the training process making corrections in some cases as the trainee performs a weld. By instruction and repetition, a new trainee learns how to weld using one or more processes. However, costs are incurred with every weld performed, which varies depending on the welding process being taught.

In more recent times, cost saving systems for training welders have been employed. Some systems incorporate a motion analyzer. The analyzer includes a physical model of a weldment, a mock electrode and sensing means that track movement of the mock electrode. A report is generated that indicates to what extent the electrode tip traveled outside an acceptable range of motion. More advanced systems incorporate the use of virtual reality, which simulates manipulation of a mock electrode in a virtual setting. Similarly, these systems track position and orientation. Such systems teach only muscle memory, but cannot teach the more advanced welding skills required of a skilled welder.

BRIEF SUMMARY

The embodiments of the present invention pertain to a system that facilitates virtual welding activity of pipe and other open root weld joints. The system may include a logic processor based system operable to execute coded instructions for generating an interactive welding environment that emulates welding activity on a section of virtual pipe having at least one virtual weld joint. It also includes a display connected to the logic processor based system for visually depicting the interactive welding environment, wherein the display depicts the section of virtual pipe. An input device is provided for performing virtual welding activity on the at least one weld joint in real time where one or more sensors are adapted to track movement of the input device in real time for communicating data about the movement of the input device to the logic processor based system.

BRIEF DESCRIPTION OF THE DRAWINGS

FIG. 9a is a perspective view of a pipe welding coupon, according to the embodiments of the subject invention.

FIG. 9b is a perspective view of a pipe welding coupon mounted into the stand, according to the embodiments of the subject invention.

FIG. 10 illustrates an example embodiment of a subsystem block diagram of a logic processor-based subsystem, according to the embodiments of the subject invention.

FIG. 13 is a flow chart of an embodiment of a method of training using the virtual reality training system, according to the embodiments of the subject invention.

FIGS. 14a-14b illustrate the concept of a welding pixel (wexel) displacement map, according to the embodiments of the subject invention.

FIG. 15 illustrates an example embodiment of a coupon space and a weld space of a flat welding coupon simulated in the simulator, according to the embodiments of the subject invention.

FIG. 17 illustrates an example embodiment of a coupon space and a weld space of a pipe welding coupon simulated in the simulator, according to the embodiments of the subject invention.

DETAILED DESCRIPTION OF THE INVENTION

Figure 1:
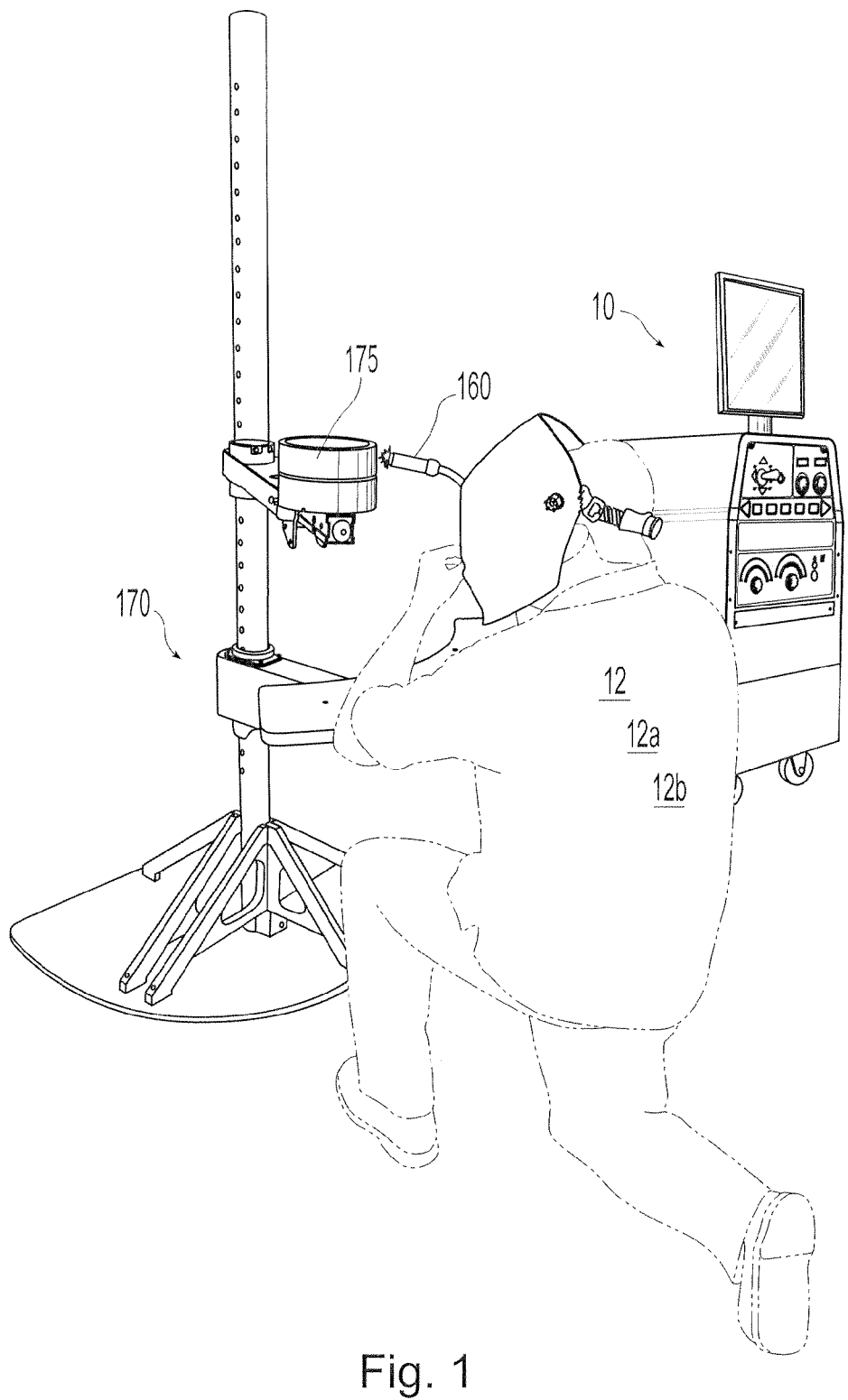
FIG. 1 is a perspective view of an end user operator engaging in virtual welding activity with a simulator, according to the embodiments of the subject invention.
Figure 2:
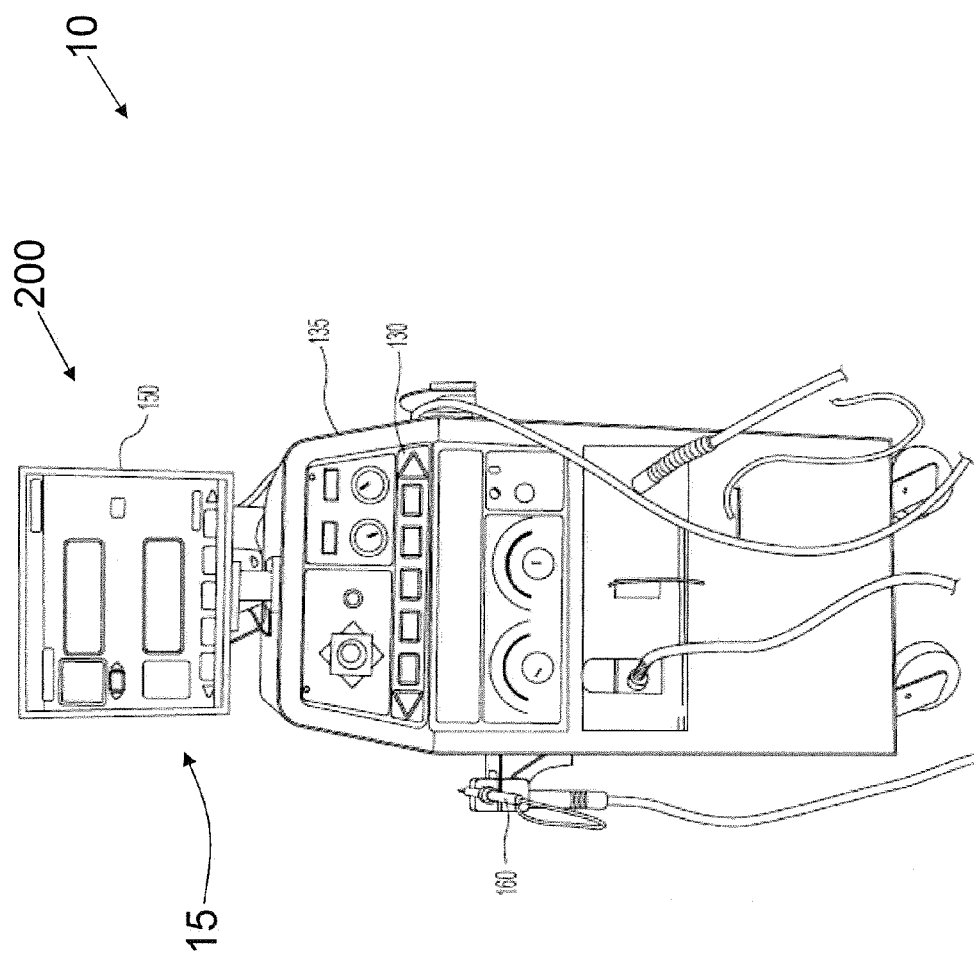
FIG. 2 is a front view of a simulator, according to the embodiments of the subject invention.

Referring now to the drawings wherein the showings are for purposes of illustrating embodiments of the invention only and not for purposes of limiting the same, FIGS. 1 and 2 show a system for simulating welding depicted generally at 10, termed herein as simulator 10 or system 10. Simulator 10 is capable of generating a virtual environment 15, which may depict a welding setting similar to that in the real world, and may be known as virtual reality arc welding (VRAW). Within the virtual environment 15, simulator 10 facilitates interaction with one or more end user(s) 12. An input device 155 is included that allows an end user 12 to engage in real-world activity, which is tracked by the simulator 10 and translated into virtual activity. The virtual environment 15 thus comprises an interactive virtual welding environment 15. A displaying device 200 is included that provides visual access into the virtual environment 15 and the end user's 12 activity. In one embodiment, simulator 10 may include a display screen 150 viewable by a plurality of end users 12 or other observers. Additionally, simulator 10 may include a personalized display 140 adapted for use by a single end user 12, which may be a trainee user 12a or an instructor user 12b. It is expressly noted here that the end user's 12 activity in the real world is translated into virtual welding activity and viewed on one or more displays 140, 150 in real-time. As used herein, the term "real-time" means perceiving and experiencing, in time, a virtual environment in the same way that an end user 12 would perceive and experience, in time, in a real-world setting.

In generating an interactive virtual welding environment 15, simulator 10 emulates one or more welding processes for a plurality of weld joints in different welding positions, and additionally emulates the effects of different kinds of electrodes for the plurality of joint configurations. In one particular embodiment, simulator 10 generates an interactive virtual welding environment 15 that emulates pipe welding and/or welding of open root joints. The system is capable of simulating a weld puddle having real-time molten metal fluidity and heat dissipation characteristics. The simulator 10 is also capable of modeling how virtual welding activity affects the weld joint, e.g. the underlying base material. Illustratively, simulator 10 may emulate welding a root pass and a hot pass, as well as subsequent filler and cap passes, each with characteristics paralleling real-world scenarios. Each subsequent pass may weld significantly different from that of the previous pass as a result of changes in the base material made during the previous pass and/or as a result of a differently selected electrode. Real-time feedback of the puddle modeling allows the end user 12 to observe the virtual welding process on the display 200 and adjust or maintain his/her technique as the virtual weld is being performed. Examples of the kinds of virtual indicators observed may include: flow of the weld puddle, shimmer of molten puddle, changes in color during puddle solidification, freeze rate of the puddle, color gradients of heat dissipation, sound, bead formation, weave pattern, formation of slag, undercut, porosity, spatter, slag entrapment, overfill, blowthrough, and occlusions to name a few. It is to be realized that the puddle characteristics are dependent upon, that is to say responsive to, the end user's 12 movement of the input device 155. In this manner, the displayed weld puddle is representative of a real-world weld puddle formed in real-time based on the selected welding process and on the end user's 12 welding technique. Furthermore, "wagon tracks" is the visual trail of weld defects and slag left behind in the toes of the root pass made during pipe welding using the SMAW process. The second pass in pipe welding, called the hot pass, must be hot enough to remelt the wagon tracks so they are eliminated in the final weldment. Also, wagon tracks may be removed by a grinding process. Such wagon tracks and elimination of the wagon tracks are properly simulated in the simulator 10 described herein, in accordance with an embodiment of the present invention.

Figure 3A:
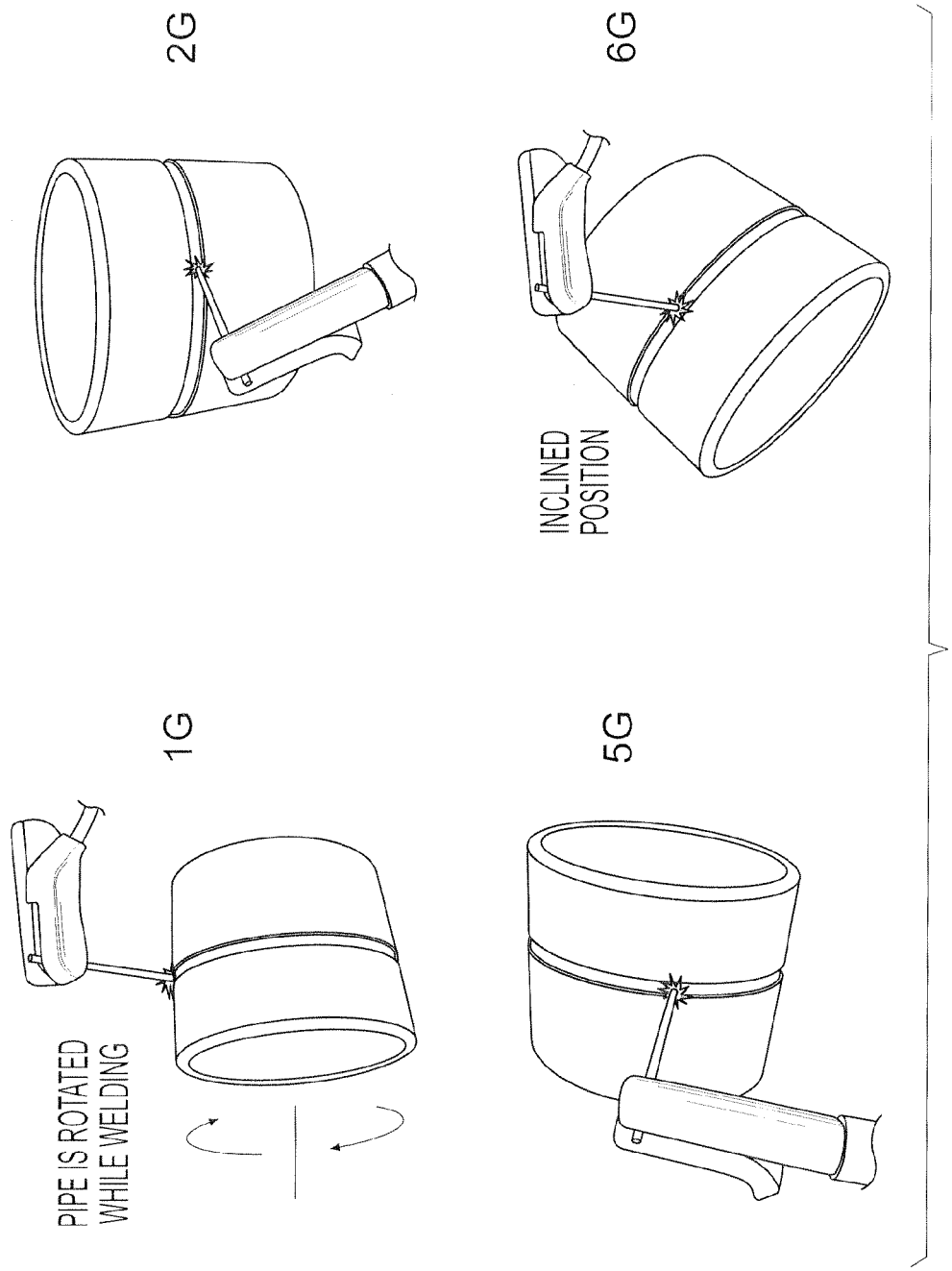
FIG. 3a is a chart showing pipe welding positions, according to the embodiments of the subject invention.
Figure 3B:
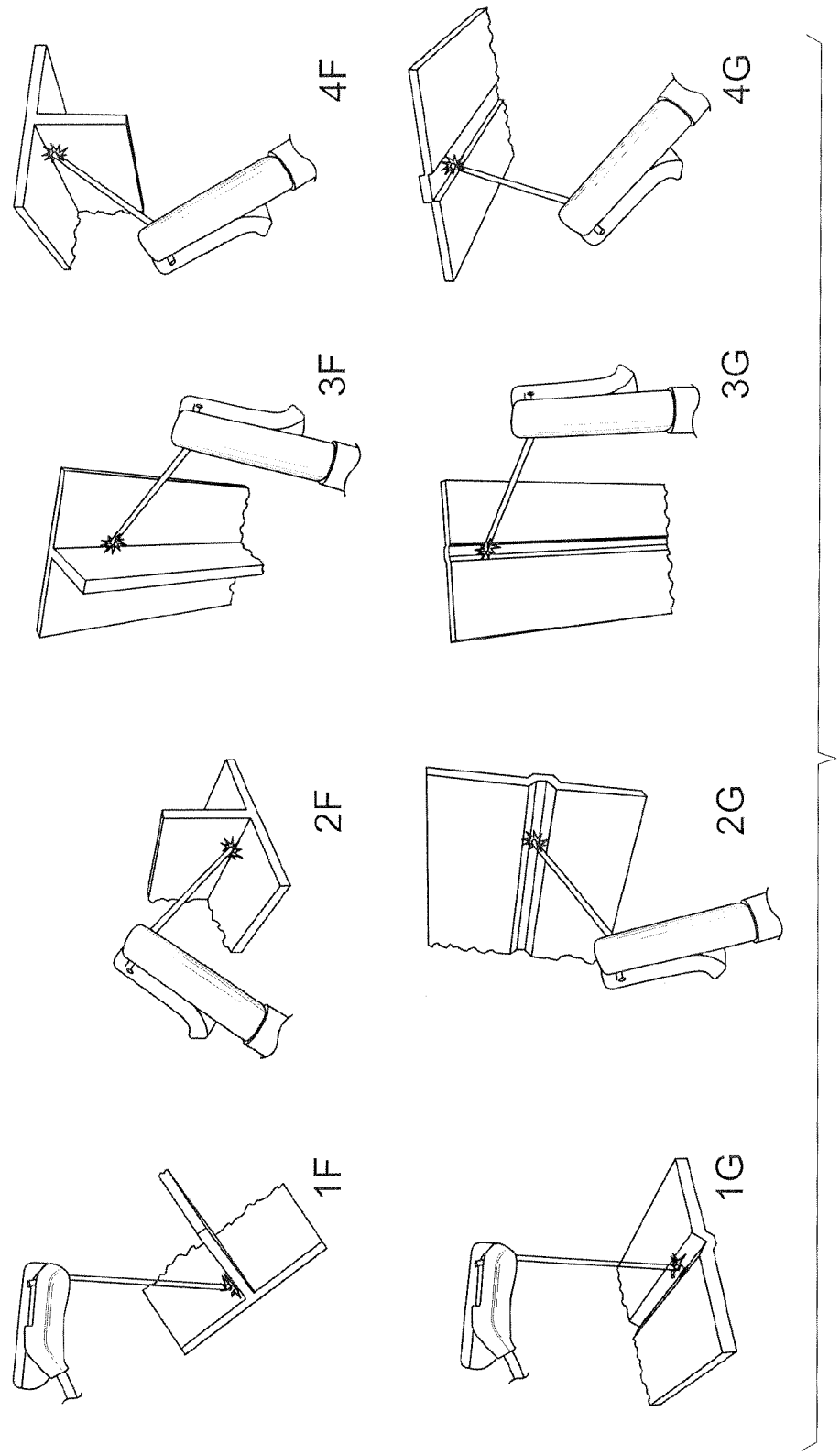
FIG. 3b is a chart showing plate welding positions, according to the embodiments of the subject invention.

With continued reference to FIGS. 1 and 2 and now also to FIGS. 3a and 3b, simulator 10 may emulate welding processes in various welding positions and models how the weld puddle reacts in each position. More specifically, simulator 10 may emulate pipe welding in vertical, horizontal and/or inclined positions referred to in the art respectively as the 5G, 2G and 6G positions. Additionally, simulator 10 may emulate welding in a 1G position which relates to the rotating horizontal position of the pipe, or in a 4G position which relates to welding overhead as may be associated with a groove weld in abutting plates. Other welding positions may relate to the welding of open root joints for various configurations of flat plate. It is to be understood that the simulator 10, including a modeling and analysis engine to be described in detail in subsequent paragraphs, takes into account the effects of gravity on the weld puddle. Accordingly, the weld puddle reacts differently, for example, for a welding pipe in a 5G position from that of a 6G position. The examples above are not to be construed as limiting, but are included for illustrative purposes. Those skilled in the art will readily understand its application to any weld joint, welding position, or type of weldment including different kinds of base material.

Figure 4:
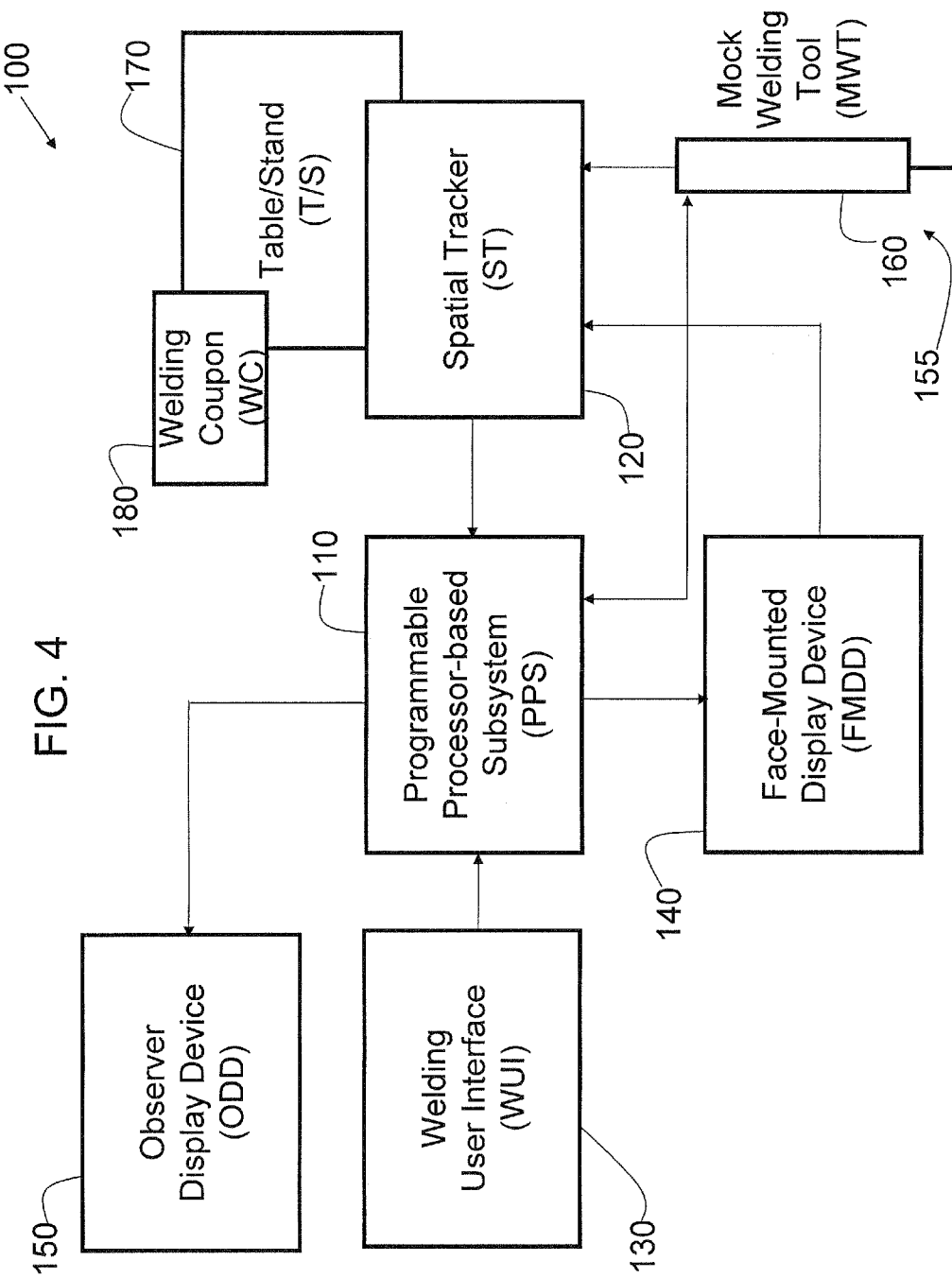
FIG. 4 is a schematic block diagram of a representation of one embodiment of a simulator.

With reference now to FIGS. 2 and 4, simulator 10 includes a logic processor-based subsystem 110, which may be programmable and operable to execute coded instructions for generating the interactive virtual welding environment 15. Simulator 10 further includes sensors and/or sensor systems, which may be comprised of a spatial tracker 120, operatively connected to the logic processor-based subsystem 110. Simulator 10 also includes a welding user interface 130 in communication with the logic processor-based subsystem 110 for set up and control of the simulator 10. As referenced above, displaying device(s) 200 are included, which may comprise a face-mounted display device 140 and an observer display device 150 each connected to the logic processor-based subsystem 110 providing visual access to the interactive virtual welding environment 15. One or more of the displaying devices 200 may be connected to the spatial tracker 120 for changing the images viewed on the device in response to its position and/or movement thereof, as described below.

Input Device

Figure 5:
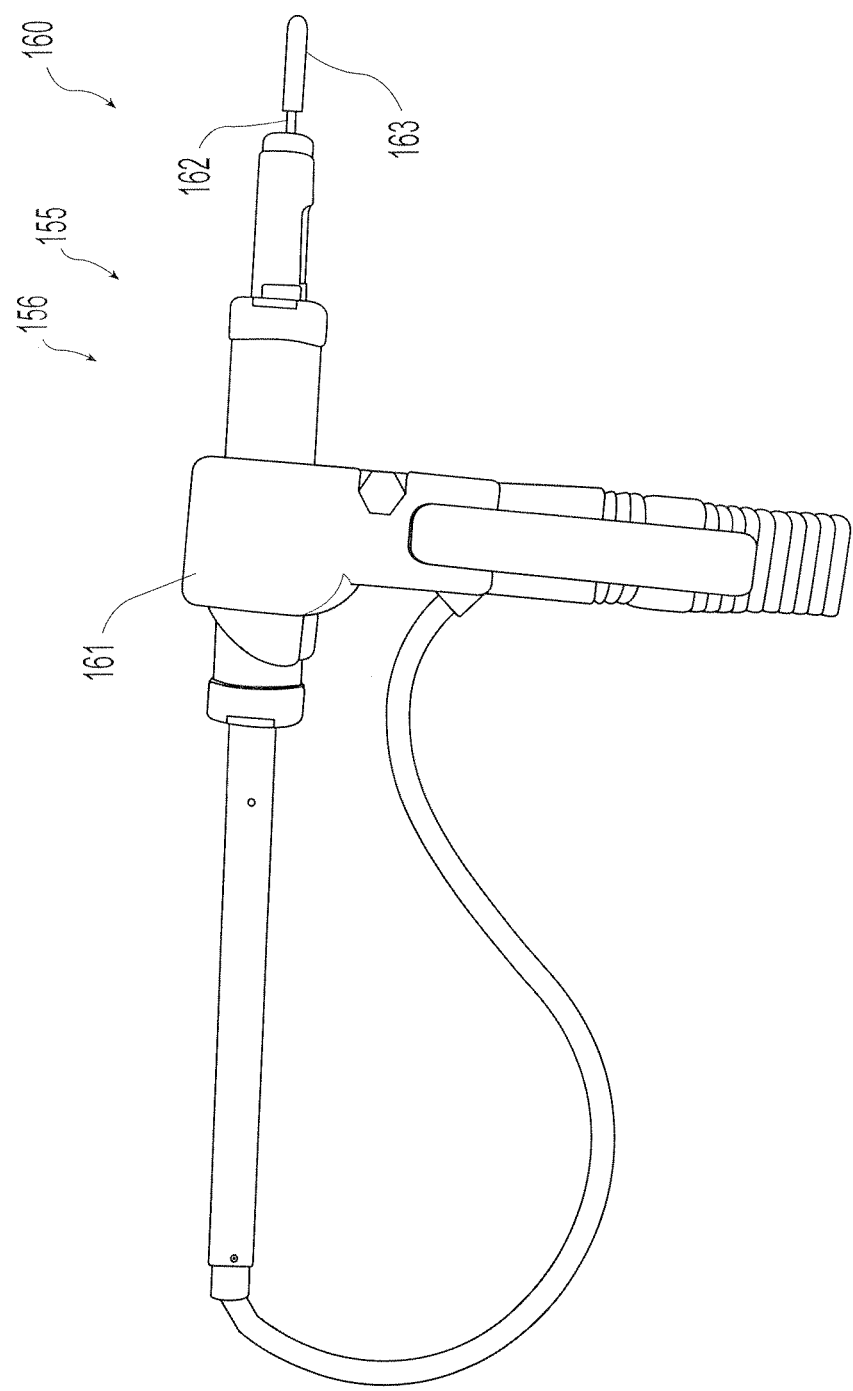
FIG. 5 is a side perspective view of a mock welding tool, according to the embodiments of the subject invention.

With reference now to FIG. 5, as mentioned above, simulator 10 includes an input device 155 that facilitates interaction with the end-user 12. In one embodiment, input device 155 comprises a mock welding tool 160. The mock welding tool 160 may be fashioned to resemble a real-world welding tool, like for example, a manual welding electrode holder or a weld gun delivering a continuous feed to electrode, i.e. MIG, FCAW, or GTAW welding tools. Still, other configurations of the mock welding tool 160 may be implemented without departing from the intended scope of coverage of the embodiments of the subject invention. For discussion purposes, the embodiments of the subject invention will be described in the context of using a mock welding tool 160 that resembles a manual welding electrode holder 156. The mock welding tool 160 may closely resemble a real world welding tool. In one particular embodiment, mock welding tool 160 may have the same shape, weight and feel as a real-world welding tool. In fact, a real welding tool could be used as the mock welding tool 160 to provide the actual feel of the tool in the user's hands, even though, in the simulator 10, the real welding tool would not be used to actually create a real arc. In this manner, end-user 12, which may be a trainee user 12a, becomes accustomed to handling a real-world welding tool thereby enhancing the virtual welding experience. However, the mock welding tool 160 may be constructed in any manner chosen with sound judgment.

Illustratively, mock welding tool 160 simulates a stick welding tool for pipe welding and includes a holder 161 and a simulated stick electrode 162 extending therefrom. The simulated stick electrode 162 may include a tactilely resistive tip 163 to simulate resistive feedback that occurs during welding in a real-world setting. If the end user 12 moves the simulated stick electrode 162 too far back out of the root (described in detail below), the end user 12 will be able to feel or sense the reduced resistance thereby deriving feedback for use in adjusting or maintaining the current welding process. It is contemplated that the stick welding tool may incorporate an actuator, not shown, that withdraws the simulated stick electrode 162 during the virtual welding process. That is to say that as end user 12 engages in virtual welding activity, the distance between holder 161 and the tip of the simulated stick electrode 162 is reduced to simulate consumption of the electrode. The consumption rate, i.e. withdrawal of the stick electrode 162, may be controlled by the logic processor-based subsystem 110 and more specifically by coded instructions executed by the logic processor-based subsystem 110. The simulated consumption rate may also depend on the end user's 12 technique. It is noteworthy to mention here that as simulator 10 facilitates virtual welding with different types of electrodes, the consumption rate or reduction of the stick electrode 162 may change with the welding procedure used and/or setup of the simulator 10.

The actuator of the mock welding tool 160 may be electrically driven. Power for engaging the actuator may come from the simulator 10, from an external power source or from internal battery power. In one embodiment, the actuator may be an electromotive device, such as an electric motor. Still, any type of actuator or form of motive force may be used including, but not limited to: electromagnetic actuators, pneumatic actuators, mechanical or spring-loaded actuators, in any combination thereof.

As indicated above, the mock welding tool 160 may work in conjunction with the spatial tracker for interacting with the simulator 10. In particular, the position and/or orientation of mock welding tool 160 may be monitored and tracked by the spatial tracker 120 in real time. Data representing the position and orientation may therefore be communicated to the logic processor-based subsystem 110 and modified or converted for use as required for interacting with the virtual welding environment 15.

Spatial Tracker

Figure 8:
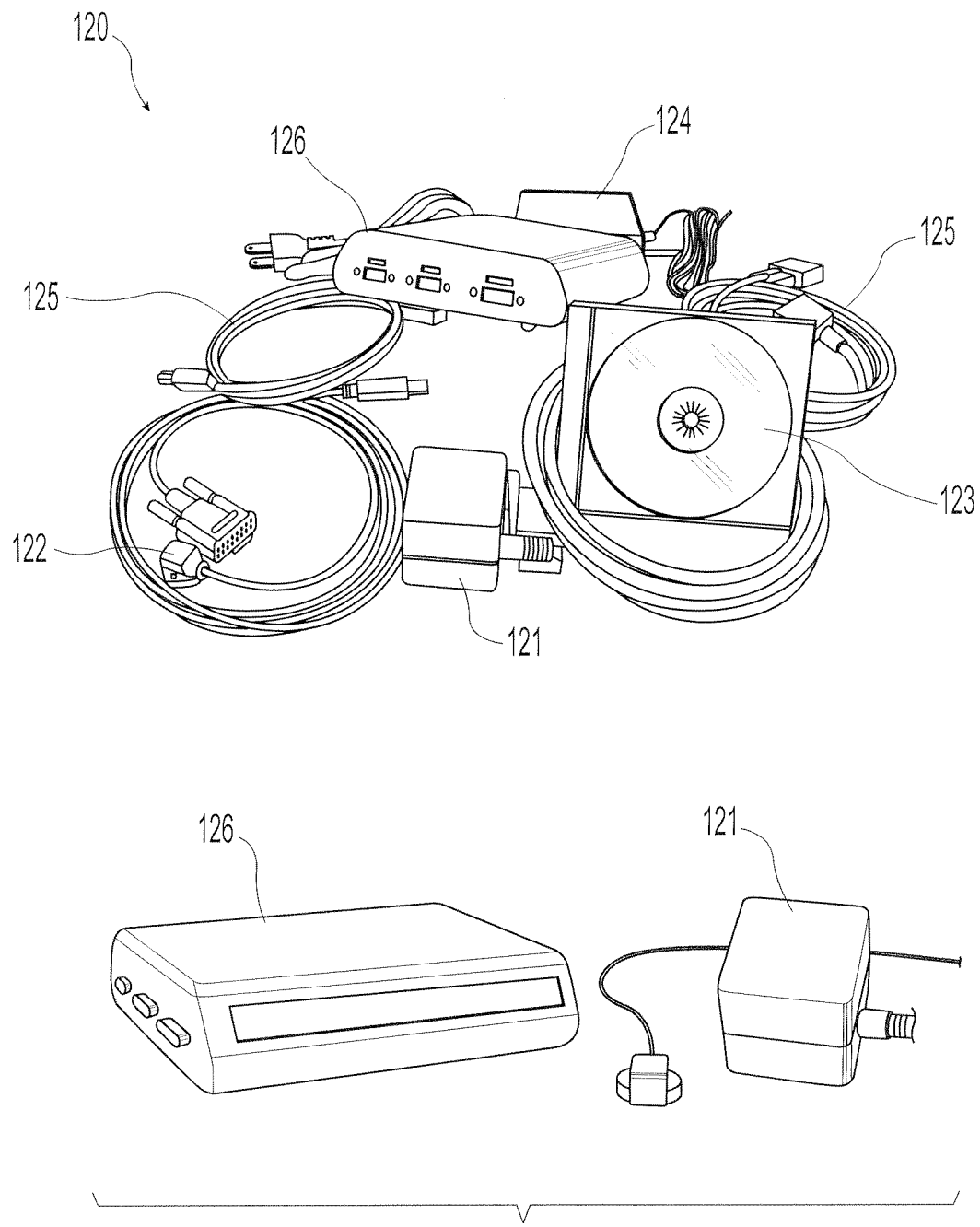
FIG. 8 is a perspective view of a spatial tracker, according to the embodiments of the subject invention.

Referencing FIG. 8, an example of a spatial tracker 120 is illustrated. Spatial tracker 120 may interface with the logic processor-based subsystem 110. In one embodiment, the spatial tracker 120 may track the mock welding tool 160 magnetically. That is to say that the spatial tracker generates a magnetic envelope, which is used to determine position and orientation, as well as speed and/or changes in speed. Accordingly, the spatial tracker 120 includes a magnetic source 121 and source cable, one or more sensors 122, host software on disk 123, a power source 124, USB and RS-232 cables 125, a processor tracking unit 126, and other associated cables. The magnetic source 121 is capable of being operatively connected to the processor tracking unit 126 via cables, as is sensor 122. The power source 124 is also capable of being operatively connected to the processor tracking unit 126 via a cable. The processor tracking unit 126 is capable of being operatively connected to the logic processor-based subsystem 110 via a USB or RS-232 cable 125. The host software on disk 123 may be loaded onto the logic processor-based subsystem 110 and allows functional communication between the spatial tracker 120 and the logic processor-based subsystem 110.

The magnetic source 121 creates a magnetic field, or envelope, surrounding the source 121 defining a three dimensional space within which end user 12 activity may be tracked for interacting with the simulator 10. The envelope establishes a spatial frame of reference. Objects used within the envelope, e.g. mock welding tool 160 and coupon stand (described below), may be comprised of non-metallic, i.e. non-ferric and non-conductive, material so as not to distort the magnetic field created by the magnetic source 121. The sensor 122 may include multiple induction coils aligned in crossing spatial directions, which may be substantially orthogonally aligned. The induction coils measure the strength of the magnetic field in each of the three directions providing information to the processor tracking unit 126. In one embodiment, the sensor 122 may be attached to the mock welding tool 160 allowing the mock welding tool 160 to be tracked with respect to the spatial frame of reference in both position and orientation. More specifically, the induction coils may be mounted in the tip of the electrode 162. In this way, simulator 10 is able to determine where within the three dimensional envelope the mock welding tool 160 is positioned. Additional sensors 122 may be provided and operatively attached to the one or more displaying devices 200. Accordingly, simulator 10 may use sensor data to change the view seen by the end user 12 responsive to the end user's 12 movements. As such, the simulator 10 captures and tracks the end user's 12 activity in the real world for translation into the virtual welding environment 15.

In accordance with an alternative embodiment of the present invention, the sensor(s) 122 may wirelessly interface to the processor tracking unit 126, and the processor tracking unit 126 may wirelessly interface to the logic processor-based subsystem 110. In accordance with other alternative embodiments of the present invention, other types of spatial trackers 120 may be used in the simulator 10 including, for example, an accelerometer/gyroscope-based tracker, an optical tracker, an infrared tracker, an acoustic tracker, a laser tracker, a radio frequency tracker, an inertial tracker, an active or passive optical tracker, and augmented reality based tracking. Still, other types of trackers may be used without departing from the intended scope of coverage of the embodiment of the subject invention.

Displaying Device

Figure 7C:
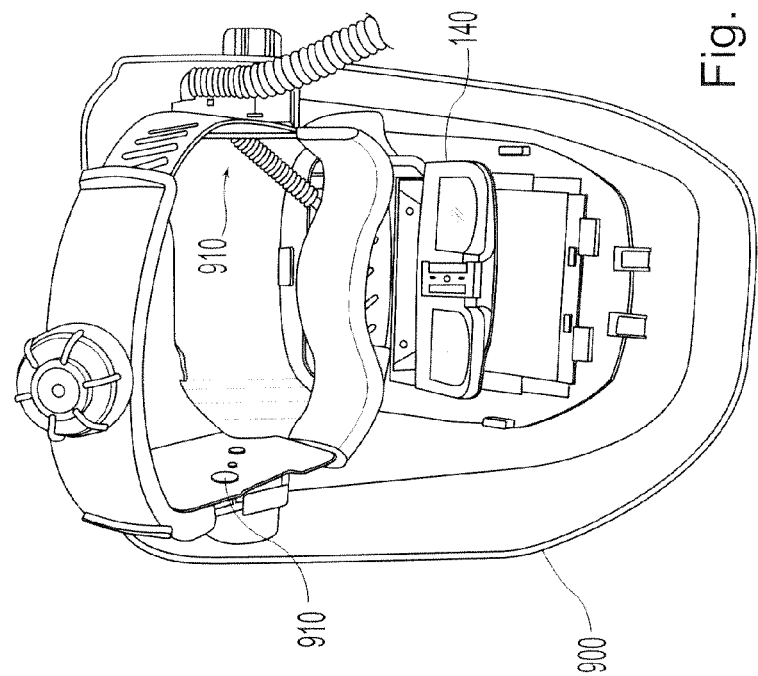
FIG. 7c is perspective view of a personalized display device mounted in a welding helmet, according to the embodiments of the subject invention.
Figure 7A:
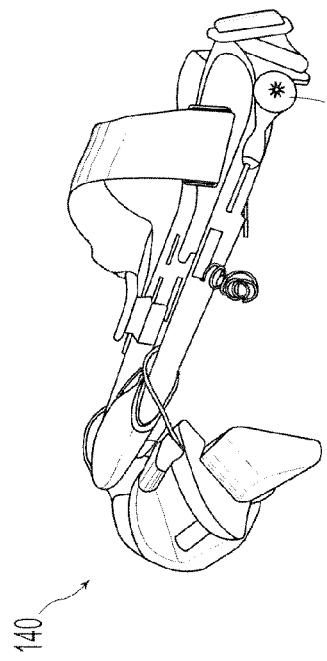
FIG. 7a is perspective view of a personalized display device, according to the embodiments of the subject invention.
Figure 7B:
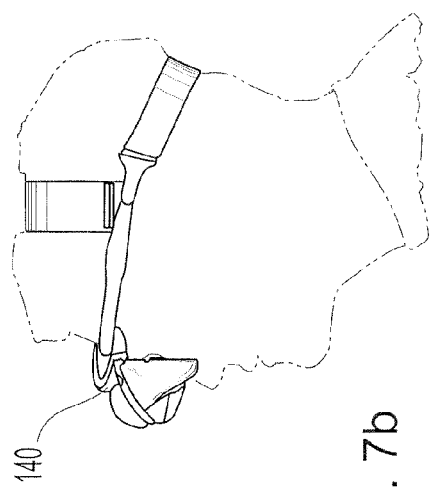
FIG. 7b is perspective view of a personalized display device worn by an end user, according to the embodiments of the subject invention.

With reference now to FIG. 7a, an example of the face-mounted display device 140 will now be described. The face mounted display device 140 may be integrated into a welding helmet 900, as shown in FIG. 7c or alternatively may be separately mounted as shown in FIG. 7b. The face mounted display device 140 may include two high-contrast SVGA 3D OLED micro-displays capable of delivering fluid full-motion video in the 2D and frame sequential video modes. Virtual images, e.g. video, from the virtual welding environment 15 is provided and displayed on the face mounted display device 140. In one embodiment of the subject invention, the logic processor-based subsystem 110 provides stereoscopic video to the face mounted display device 140, enhancing the depth perception of the user. Stereoscopic images may be produced by a logic processing unit, which may be a graphics processing unit described in detail below. A zoom, e.g., 2×, mode may also be provided, allowing a user to simulate a cheater plate. The face mounted display device 140 operatively connects to the logic processor-based subsystem 110 and the spatial tracker 120 via wired or wireless means. A sensor 122 of the spatial tracker 120 may be attached to the face mounted display device 140 or to the welding helmet 900 thereby allowing the face mounted display device 140 to be tracked with respect to the 3D spatial frame of reference created by the spatial tracker 120. In this way, movement of the welding helmet 900 responsively alters the image seen by the end user 12 in a three dimensional virtual reality setting.

The face mounted display device 140 may also function to call up and display menu items similar to that of observer display device 150, as subsequently described. In this manner, an end user is therefore able to use a control on the mock welding tool 160 (e.g., a button or switch) to activate and select options from the menu. This may allow the user to easily reset a weld if he makes a mistake, change certain parameters, or back up to re-do a portion of a weld bead trajectory, for example.

The face mounted display device 140 may further include speakers 910, allowing the user to hear simulated welding-related and environmental sounds produced by the simulator 10. Sound content functionality and welding sounds provide particular types of welding sounds that change depending on if certain welding parameters are within tolerance or out of tolerance. Sounds are tailored to the various welding processes and parameters. For example, in a MIG spray arc welding process, a crackling sound is provided when the user does not have the mock welding tool 160 positioned correctly, and a hissing sound is provided when the mock welding tool 160 is positioned correctly. In a short arc welding process, a hissing sound is provided when undercutting is occurring. These sounds mimic real world sounds corresponding to correct and incorrect welding technique.

High fidelity sound content may be taken from real world recordings of actual welding using a variety of electronic and mechanical means. The perceived volume and direction of the sound is modified depending on the position, orientation, and distance of the end user's head, i.e. the face mounted display device 140, with respect to the simulated arc between the mock welding tool 160 and the welding coupon 175. Sound may be provided to the user via speakers 910, which may be earbud speakers or any other type of speakers or sound generating device, mounted in the face mounted display device 140 or alternatively mounted in the console 135 and/or stand 170. Still, any manner of presenting sound to the end user 12 while engaging in virtual welding activity may be chosen. It is also noted here that other types of sound information may be communicated through the speakers 910. Examples include verbal instructions from the instructor user 12b, in either real time or via prerecorded messages. Prerecorded messages may be automatically triggered by particular virtual welding activity. Real time instructions may be generated on site or from a remote location. Still, any type of message or instruction may be conveyed to end user 12.

Console

Figure 6:
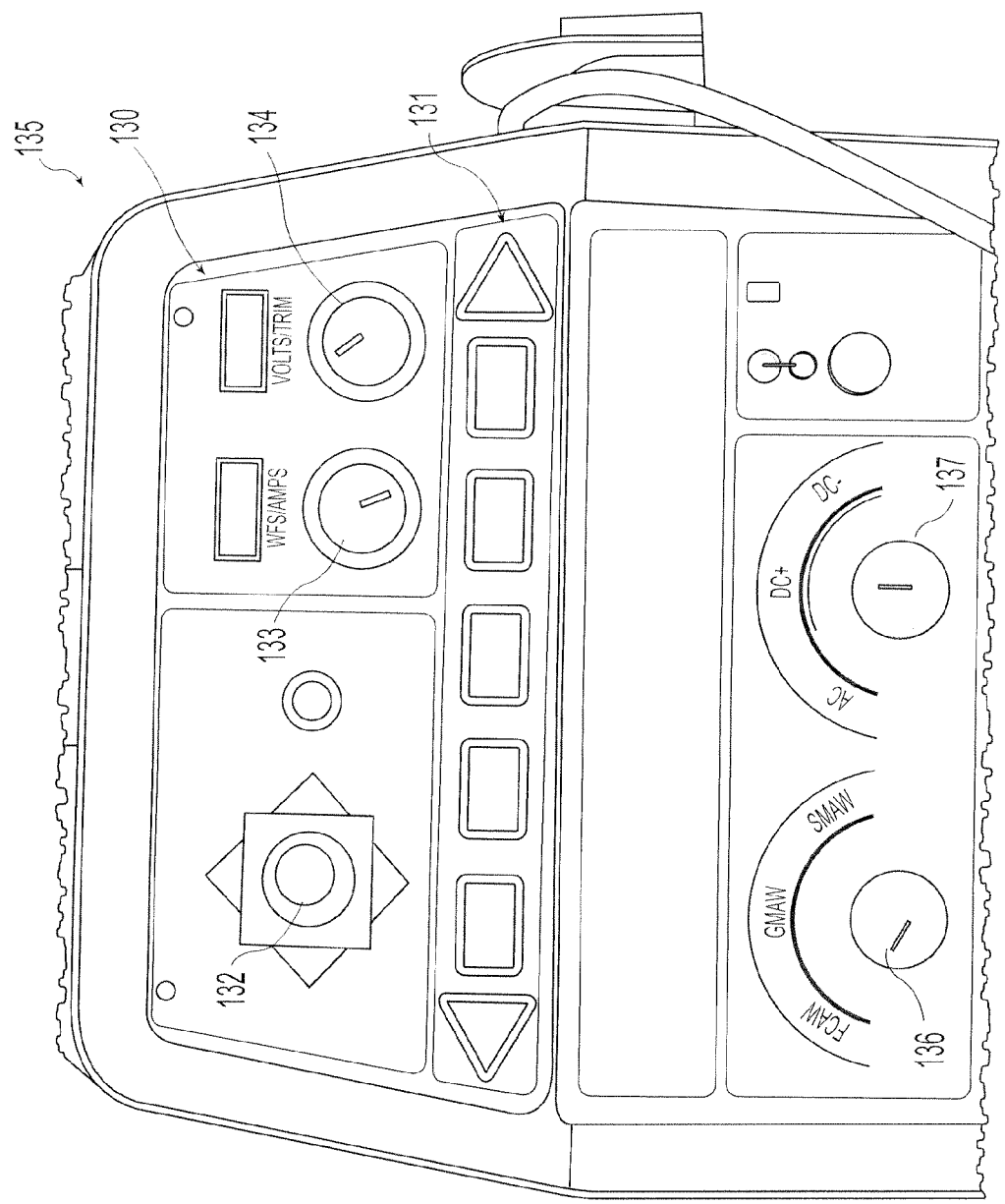
FIG. 6 is a close up view of welding user interface, according to the embodiments of the subject invention.

With reference now to FIGS. 2, 6 and 7, the simulator 10 may include a console 135 housing one or more components of the simulator 10. In one embodiment, the console 135 may be constructed to resemble a welding power source. That is to say that the shape and size of the console 135 may match that of a real-world device. Operation of the simulator 10 may be facilitated by a welding unit interface 130, which may be fashioned to resemble welding power source knobs, dials and/or switches 133, 134. Simulator 10 may further include a display, which may be displaying device 200. Coded instructions, i.e. software, installed onto the simulator 10 may direct the end user's 12 interaction with the simulator 10 by displaying instructions and/or menu options on the display screen 200. Interaction with the simulator 10 may include functions relating to: administrative activity or simulation set up and activation. This may include selection of a particular welding process and electrode type, as well as part set up including welding position. Selections made by way of welding unit interface 130 are reflected on the displaying device 200.

FIG. 6 illustrates an exemplary embodiment of the console 135 and welding user interface 130. The welding unit interface 130 may include a set of buttons 131 corresponding to the user selections 153 used during set up and operation of the simulator 10. The buttons 131 may be colored to correspond to colors of the user selections 153 displayed on displaying device 200. When one of the buttons 131 is pressed, a signal is sent to the logic processor-based subsystem 110 to activate the corresponding function. The welding unit interface 130 may also include a joystick 132 capable of being used by a user to select various parameters and selections displayed on the displaying device 200. The welding unit interface 130 further includes a dial or knob 133, which in an exemplary manner, may be used for adjusting wire feed speed/amps, and another dial or knob 134 for adjusting volts/trim. The welding unit interface 130 also includes a dial or knob 136 for selecting an arc welding process. In accordance with an embodiment of the present invention, three arc welding processes are selectable including flux cored arc welding (FCAW), gas metal arc welding (GMAW), and shielded metal arc welding (SMAW). The welding unit interface 130 further includes a dial or knob 137 for selecting a welding polarity. In accordance with an embodiment of the present invention, three arc welding polarities are selectable including alternating current (AC), positive direct current (DC+), and negative direct current (DC−). Still, other welding processes and set up features may be incorporated in the simulator 10 without departing from the intended scope of coverage of the embodiments of the subject invention, including but not limited to TIG welding. From the aforementioned, it will be readily seen that set up of the simulator 10 parallels set up of a real-world device.

The graphical user interface functionality 1213 (see FIG. 12) allows a user, viewable via the observer display device 150 and using the joystick 132 of the physical user interface 130, to set up a welding scenario. The set up of a welding scenario may include selecting a language, entering an end user name, selecting a practice plate (e.g. a welding coupon, T-plate, flat plate), selecting a welding process (e.g., FCAW, GMAW, SMAW, TIG) and associated axial spray, pulse, or short arc mode of transfer, selecting a gas type and flow rate, selecting a type of stick electrode (e.g., E6010 or E7018), and selecting a type of flux cored wire (e.g., self-shielded, gas-shielded). The set up of a welding scenario may also include setting up a coupon stand 170 to be discussed in detail below. The set up of a welding scenario further includes selecting an environment (e.g., a background environment in virtual reality space), setting a wire feed speed, setting a voltage level, selecting a polarity, and turning particular visual cues on or off. It is noted here that in one embodiment, limitations may be incorporated into the simulator 10, which may be software limitations, that prevent operation of a given welding scenario until the appropriate settings for a selected process have been properly entered. In this way, trainee users 12a are taught or learn the proper range of real-world welding settings by setting up virtual welding scenarios.

Accordingly, displaying device 200 reflects activity corresponding to the end user selections 153 including menu, actions, visual cues, new coupon set up, and scoring. These user selections may be tied to user buttons on the console 135. As a user makes various selections via displaying device 200, the displayed characteristics can change to provide selected information and other options to the user. However, the displaying device 200, which may be an observer display device 150, may have another function, which is to display virtual images seen by the end user 12 during operation of the simulator 10, i.e. while engaging in virtual welding activity. Displaying device 200 may be set up to view the same image as seen by the end user 12. Alternatively, displaying device 200 may also be used to display a different view, or different perspective of the virtual welding activity.

In one embodiment, displaying device 150, 200 may be used to play back virtual welding activity stored electronically on data storage devices 300, shown in FIG. 10. Data representing the end user's 12 virtual welding activity may be stored for: playback and review, downloaded for archiving purposes and/or transmitted to remote locations for viewing and critiquing in real-time. In replaying the virtual welding activity, details such as weld puddle fluidity, travel speed, as well as discontinuity states 152 including, for example, improper fillet size, poor bead placement, concave bead, excessive convexity, undercut, porosity, incomplete fusion, slag entrapment, excess spatter, and burn-through, may be represented. Undercut may also be displayed, which is the result of an out of tolerance angle. Moreover, porosity may be displayed caused by moving the arc too far away from the weldment. In this manner, the simulator 10 is capable of replaying part or all of particular virtual welding activity, modeling all aspects of the virtual welding scenario including occlusions and defects related directly to the end user's activity.

Figure 6A:
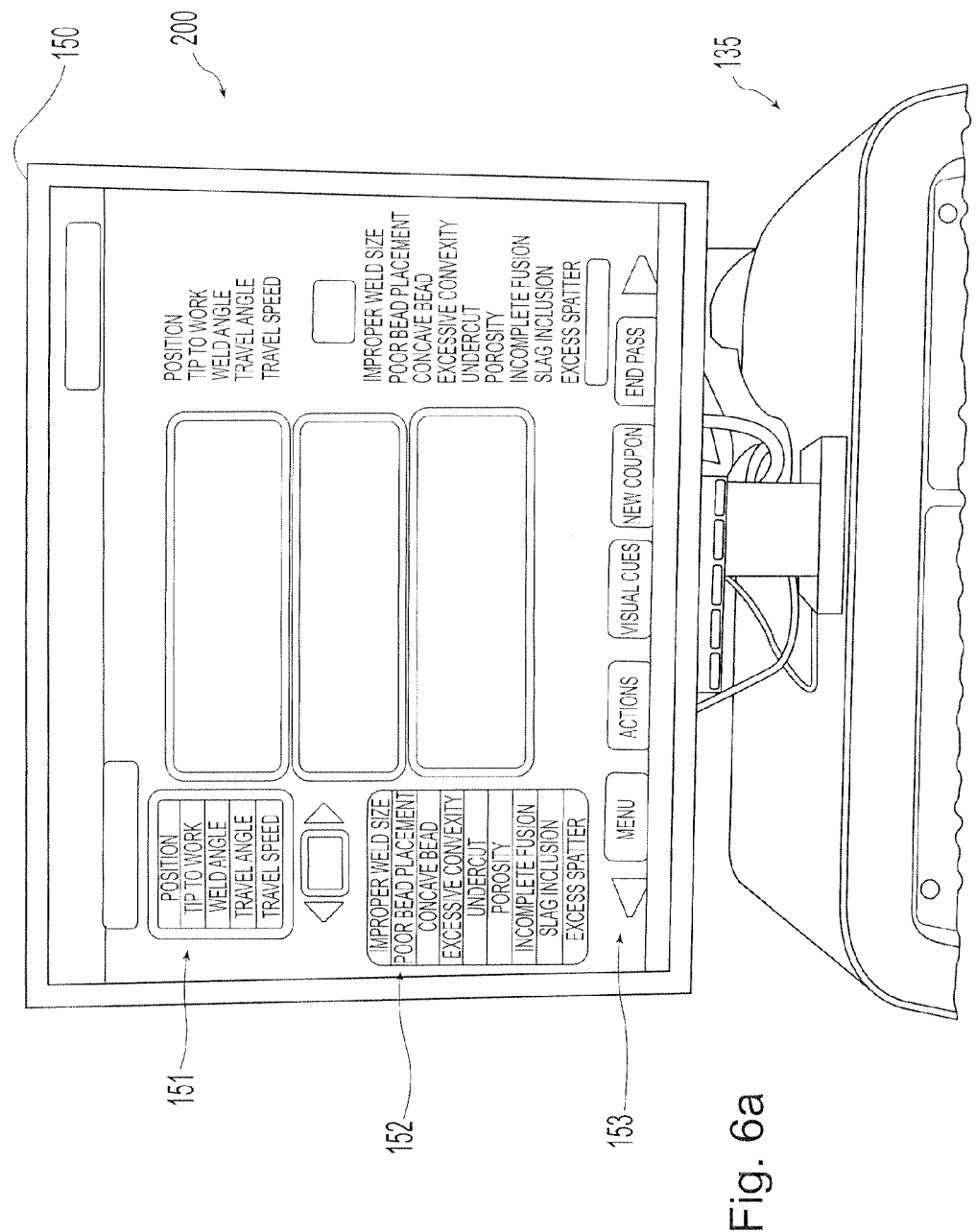
FIG. 6a is a close up view of an observer display device, according to the embodiments of the subject invention.

Referencing FIG. 6a, simulator 10 is also capable of analyzing and displaying the results of virtual welding activity. By analyzing the results, it is meant that simulator 10 is capable of determining when during the welding pass and where along the weld joints, the end user 12 deviated from the acceptable limits of the welding process. A score may be attributed to the end user's 12 performance. In one embodiment, the score may be a function of deviation in position, orientation and speed of the mock welding tool 160 through ranges of tolerances, which may extend from an ideal welding pass to marginal or unacceptable welding activity. Any gradient of ranges may be incorporated into the simulator 10 as chosen for scoring the end user's 12 performance. Scoring may be displayed numerically or alpha-numerically. Additionally, the end user's 12 performance may be displayed graphically showing, in time and/or position along the weld joint, how closely the mock welding tool traversed the weld joint. Parameters such as travel angle, work angle, speed, and distance from the weld joint are examples of what may be measured, although any parameters may be analyzed for scoring purposes. The tolerance ranges of the parameters are taken from real-world welding data, thereby providing accurate feedback as to how the end user will perform in the real world. In another embodiment, analysis of the defects corresponding to the end user's 12 performance may also be incorporated and displayed on the displaying device 150, 200. In this embodiment, a graph may be depicted indicating what type of discontinuity resulted from measuring the various parameters monitored during the virtual welding activity. While occlusions may not be visible on the displaying device 200, defects may still have occurred as a result of the end user's 12 performance, the results of which may still be correspondingly displayed, i.e. graphed.

Displaying device 200 may also be used to display tutorial information used to train an end user 12. Examples of tutorial information may include instructions, which may be displayed graphically as depicted by video or pictures. Additionally, instructions may be written or presented in audio format, mentioned above. Such information may be stored and maintained on the data storage devices 300. In one embodiment, simulator 10 is capable of displaying virtual welding scenes showing various welding parameters 151 including position, tip to work, weld angle, travel angle, and travel speed, termed herein as visual cues.

In one embodiment, remote communications may be used to provide virtual instruction by offsite personnel, i.e. remote users, working from similarly or dissimilarly constructed devices, i.e. simulators. Portraying a virtual welding process may be accomplished via a network connection including but not limited to the internet, LANs, and other means of data transmission. Data representing a particular weld (including performance variables) may be sent to another system capable of displaying the virtual image and/or weld data. It should be noted that the transmitted data is sufficiently detailed for allowing remote user(s) to analyze the welder's performance. Data sent to a remote system may be used to generate a virtual welding environment thereby recreating a particular welding process. Still, any way of communicating performance data or virtual welding activity to another device may be implemented without departing from the intended scope of coverage of the embodiments of the subject invention.

Welding Coupon

With reference now to FIGS. 1, 9a and 9b, simulator 10 may include a welding coupon 175 that resembles pipe sections juxtaposed to form a welding joint 176. The welding coupon 175 may work in conjunction with the simulator 10 serving as a guide for the end user 12 while engaging in virtual welding activity. A plurality of welding coupons 175 may be used, that is to say interchanged for use in a given cycle of virtual welding activity. The types of welding coupons may include cylindrical pipe sections, arcuate pipe segments, flat plate and T-plate weld joints, just to name a few. In one embodiment, each of the welding coupons may incorporate open root joints or grooves. However, any configurations of weld joints may be incorporated into a welding coupon without departing from the intended scope of coverage of the embodiments of the subject invention.

The dimensions of welding coupons 175 may vary. For cylindrical pipe, the range of inside diameters may extend from 1½ inches (inside diameter) to 18 inches (inside diameter). In one particular embodiment, the range of inside diameters may exceed 18 inches. In another embodiment, arcuate pipe segments may have a characteristic radius in the range extending from 1½ inches (inside diameter) up to and exceeding 18 inches (inside diameter). Furthermore, it is to be construed that any inside diameter of welding coupon 175 may be utilized, both those smaller than 1½ inches and those exceeding 18 inches. In a practical sense, any size of welding coupon 175 can be used as long as the welding coupon 175, or a portion of the welding coupon 175, fits within the envelope generated by the spatial tracker 120. Flat plate may extend up to and exceed 18 inches in length as well. Still, it is to be understood that the upper dimensional limits of a welding coupon 175 are constrained only by the size and strength of the sensing field generated by the spatial tracker 120 and its ability to be positioned respective of the welding coupon 175. All such variations are to be construed as falling within the scope of coverage of the embodiments of the subject invention.

As mentioned above, the welding coupon 175 may be constructed from a material that does not interfere with the spatial tracker 120. For spatial trackers generating a magnetic field, the welding coupon 175 may be constructed from non-ferrous and non-conductive material. However, any type of material may be chosen that is suitable for use with the type of spatial tracker 120 or other sensors selected.

Referencing FIGS. 9a and 9b, the welding coupon 175 may be constructed so that it fits into a table or stand 170, which functions (at least in part) to hold the welding coupon 175 constant with respect to the spatial tracker 120. Accordingly, the welding coupon 175 may include a connecting portion 177 or connector 177. The connecting portion 177 may extend from one side of the welding coupon 175, which as illustrated may be the bottom side, and may be received into a mechanical interlocking device included with the stand 170. It will be appreciated that the orientation at which the welding coupon 175 is inserted into the stand 170 may need to be constant, i.e. repeatable, for closely matching the virtual weldment, i.e. pipe, created within the virtual welding environment 15. In this manner, as long as the simulator 10 is aware of how the position of the welding coupon 175 has changed, adjustments to the virtual counterpart may be made accordingly. For example, during set up, the end user 12 may select the size of pipe to be welded on. The end user 12 may then insert the appropriate welding coupon 175 into the stand 170, locking it into position. Subsequently, the end user 12 may choose a desired welding position making the selection via the welding user interface 130. As will be described below, the stand 170 may then be tilted or adjusted to position the welding coupon 175 in any of the welding positions recognized by the simulator 10. Of course, it will be appreciated that adjusting the position of the welding coupon 175 also adjusts the position of the spatial tracker 120 thereby preserving the relative position of the welding coupon 175 within the sensory tracking field.

Figure 9:
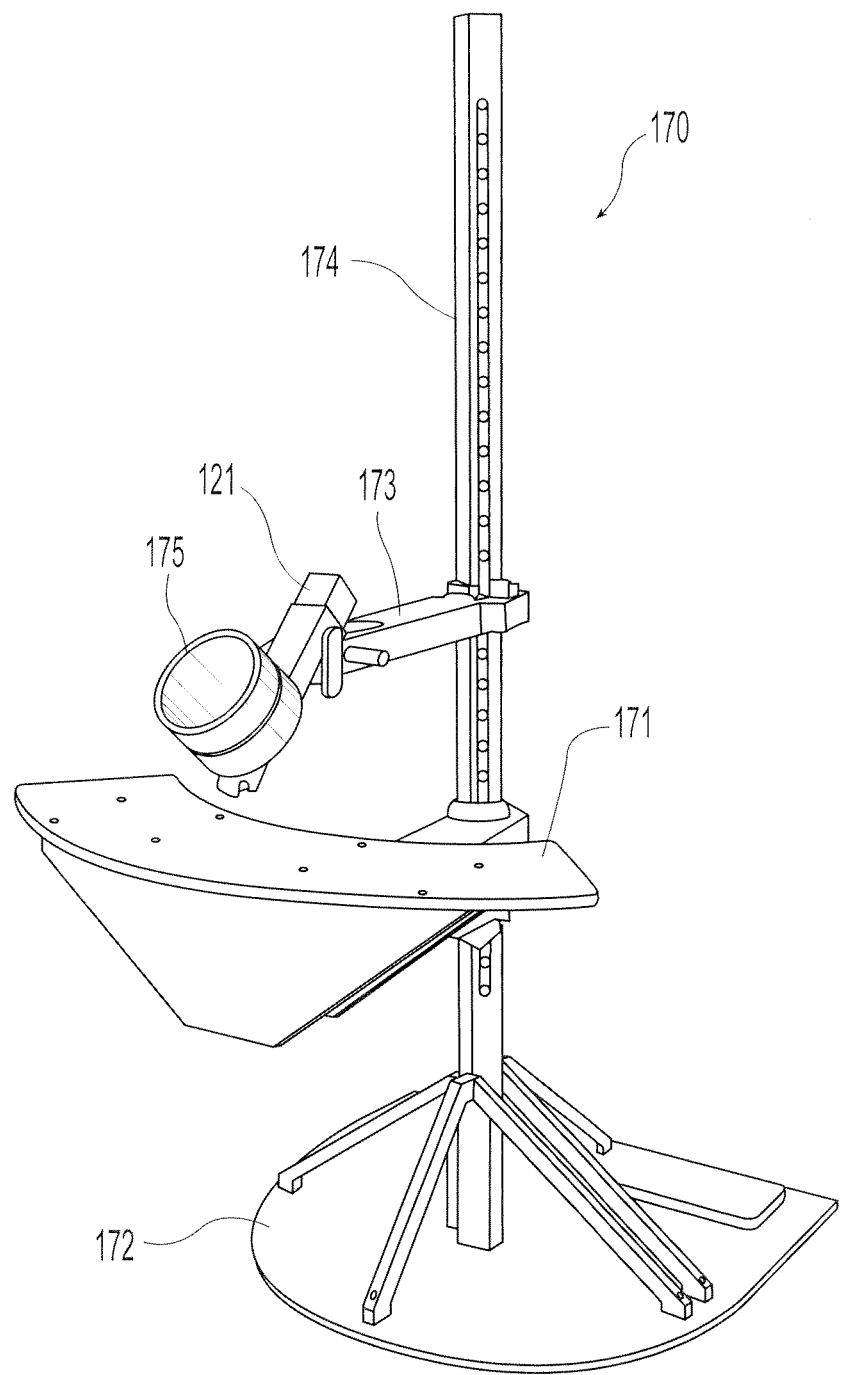
FIG. 9 is a perspective view of a stand for holding welding coupons, according to the embodiments of the subject invention.

FIG. 9 depicts one embodiment of the stand 170. The stand 170 may include an adjustable table 171, a stand base 172, an adjustable arm 173, and a vertical post 174. The table 171 and the arm 173 are respectively attached to the vertical post 174. The table 171 and the arm 173 are each capable of being adjusted along the height of the vertical post 174, which may include upward, downward, and/or rotational movement with respect to the vertical post 174. The arm 173 is used to hold the welding coupon 175, in a manner consistent with that discussed herein. The table 171 may assist the end user 12 by allowing his/her arms to rest on the table 171 during use. In one particular embodiment, the vertical post 174 is indexed with position information such that a user may know exactly where the arm 173 and the table 171 are positioned. This information may also be entered into the simulator 10 by way of the welding user interface 130 and the displaying device 150 during set up.

An alternative embodiment of the subject invention is contemplated wherein the positions of the table 171 and the arm 173 are automatically adjusted responsive to selections made during set up of the simulator 10. In this embodiment, selections made via the welding user interface 130 may be communicated to the logic processor-based subsystem 110. Actuators and feedback sensors employed by the stand 170 may be controlled by the logic processor-based subsystem 110 for positioning the welding coupon 175 without physically moving the arm 173 or the table 171. In one embodiment, the actuators and feedback sensors may comprise electrically driven servomotors. However, any locomotive device may be used to automatically adjust the position of the stand 170 as chosen with sound engineering judgment. In this manner, the process of setting up the welding coupon 175 is automated and does not require manual adjustment by the end user 12.

Another embodiment of the subject invention includes the use of intelligence devices used in conjunction with the welding coupon 175, termed herein as "smart" coupons 175. In this embodiment, the welding coupon 175 includes a device having information about that particular welding coupon 175 that may be sensed by the stand 170. In particular, the arm 173 may include detectors that read data stored on or within the device located on the welding coupon 175. Examples may include the use of digital data encoded on a sensor, e.g. micro-electronic device, that may be read wirelessly when brought into proximity of the detectors. Other examples may include the use of passive devices like bar coding. Still any manner of intelligently communicating information about the welding coupon 175 to the logic processor-based subsystem 110 may be chosen with sound engineering judgment.

The data stored on the welding coupon 175 may automatically indicate, to the simulator 10, the kind of welding coupon 175 that has been inserted in the stand 170. For example, a 2-inch pipe coupon may include information related to its diameter. Alternatively, a flat plate coupon may include information that indicates the kind of weld joint included on the coupon, e.g. groove weld joint or a butt weld joint, as well as its physical dimensions. In this manner, information about the welding coupon 175 may be used to automate that portion of the setup of the simulator 10 related to selecting and installing a welding coupon 175.

Calibration functionality 1208 (see FIG. 12) provides the capability to match up physical components in real world space (3D frame of reference) with visual components in the virtual welding environment 15. Each different type of welding coupon 175 is calibrated in the factory by mounting the welding coupon 175 to the arm 173 of the stand 170 and touching the welding coupon 175 at predefined points 179 (indicated by, for example, three dimples 179 on the welding coupon 175) with a calibration stylus operatively connected to the stand 170. The simulator 10 reads the magnetic field intensities at the predefined points 179, provides position information to the logic processor-based subsystem 110, and the logic processor-based subsystem 110 uses the position information to perform the calibration (i.e., the translation from real world space to virtual reality space).

Any part of the same type of welding coupon 175, accordingly, fits into the arm 173 of the stand 170 in the same repeatable way to within very tight tolerances. Therefore, once a particular type welding coupon 175 is calibrated, repeated calibration of similar coupons is not necessary, i.e. calibration of a particular type of welding coupon 175 is a one-time event. Stated differently, welding coupons 175 of the same type are interchangeable. Calibration ensures that physical feedback perceived by the user during a welding process matches up with what is displayed to the user in virtual reality space, making the simulation seem more real. For example, if the user slides the tip of a mock welding tool 160 around the corner of an actual welding coupon 175, the user will see the tip sliding around the corner of the virtual welding coupon on the displaying device 200 as the user feels the tip sliding around the actual corner. In accordance with an embodiment of the present invention, the mock welding tool 160 may also be placed in a pre-positioned jig and calibrated in a similar manner, based on the known jig position.

In accordance with another embodiment of the subject invention, "smart" coupons may include sensors that allow the simulator 10 to track the pre-defined calibration point, or corners of the "smart" coupon. The sensors may be mounted on the welding coupon 175 at the precise location of the predefined calibration points. However, any manner of communicating calibration data to the simulator 10 may be chosen. Accordingly, the simulator 10 continuously knows where the "smart" coupon is in real world 3D space. Furthermore, licensing keys may be provided to "unlock" welding coupons 175. When a particular welding coupon 175 is purchased, a licensing key may be provided that allows the end user 12*a*, 12*b* to enter the licensing key into the simulator 10, unlocking the software associated with that particular welding coupon 175. In an alternative embodiment, special non-standard welding coupons may be provided based on real-world CAD drawings of parts.

Processor-Based System

With reference now to FIGS. 2, 4 and 10, as mentioned above, simulator 10 includes a logic processor-based subsystem 110, which may comprise programmable electronic circuitry 200 for executing coded instructions used to generate the virtual welding environment 15. The programmable electronic circuitry 200 may include one or more logic processors 203 or logic processor-based systems 203, which may be comprised of one or more microprocessors 204. In one particular embodiment, the programmable electronic circuitry 200 may be comprised of central processing unit(s) (CPU) and graphics processing unit(s) (GPU), to be discussed further below. Additional circuitry may be included, like for example electronic memory, i.e. RAM, ROM, as well as other peripheral support circuitry. It is noted that electronic memory may be included for both the CPU and the GPU, each of which may be separately programmable for use in rendering aspects of the virtual welding environment 15 as described herein. Moreover, the programmable electronic circuitry 200 may include and utilize data storage devices 300 such as hard disk drives, optical storage devices, flash memory and the like. Still other types of electronic circuitry may be included that facilitate the transfer of data between devices within the simulator 10 or between different simulators 10. This may include, for example, receiving data from one or more input devices 155, e.g. spatial tracker or sensor, or transferring data over one or more networks which may be a local area networks (LAN), a wide area network (WAN) and/or Internet. It is to be understood that the aforementioned devices and processes are exemplary in nature and should not be construed as limiting. In fact, any form of programmable circuitry, support circuitry, communication circuitry and/or data storage may be incorporated into the embodiments of the subject invention as chosen with sound engineering judgment.

FIG. 10 illustrates an example embodiment of a subsystem block diagram of the logic processor-based subsystem 110 of the simulator 10. The logic processor-based subsystem 110 may include a central processing unit (CPU) 111 and two graphics processing units (GPU) 115. The two GPUs 115 may be programmed to provide virtual reality simulation of a weld puddle having real-time molten metal fluidity and heat absorption and dissipation characteristics.

Figure 11:
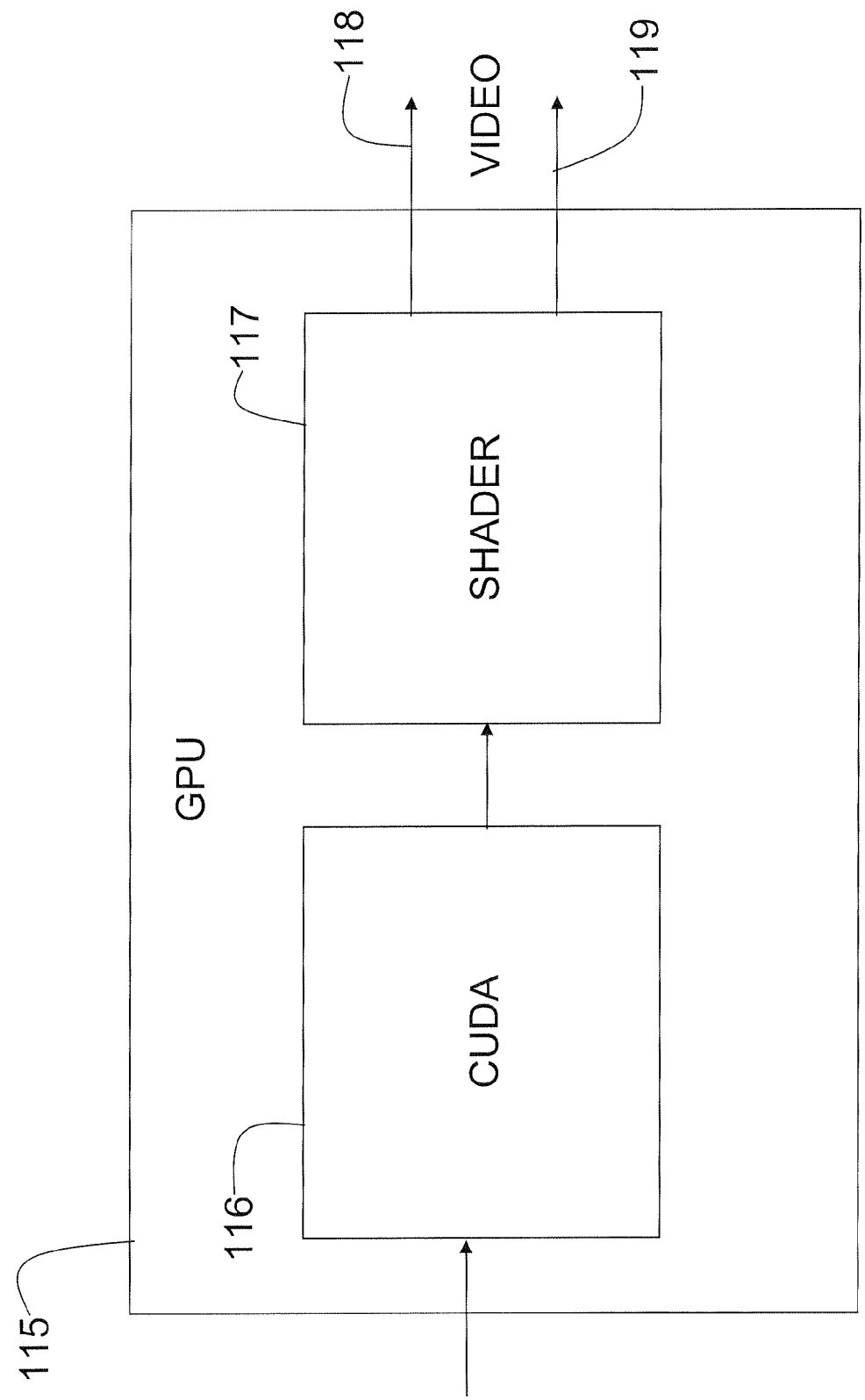
FIG. 11 illustrates an example embodiment of a block diagram of a graphics processing unit (GPU) of the logic processor-based subsystem, according to the embodiments of the subject invention.

With reference to FIG. 11, a block diagram of the graphics processing unit (GPU) 115 is shown. Each GPU 115 supports the implementation of data parallel algorithms. In accordance with an embodiment of the present invention, each GPU 115 provides two video outputs 118 and 119 capable of providing two virtual reality views. Two of the video outputs may be routed to the face-mounted display device 140, rendering the welder's point of view, and a third video output may be routed to the observer display device 150, for example, rendering either the welder's point of view or some other point of view. The remaining fourth video output may be routed to a projector, for example, or used for any other purpose suitable for simulating a virtual welding environment 15. Both GPUs 115 may perform the same welding physics computations but may render the virtual welding environment 15 from the same or different points of view. The GPU 115 includes a computed unified device architecture (CUDA) 116 and a shader 117. The CUDA 116 is the computing engine of the GPU 115 which is accessible to software developers through industry standard programming languages. The CUDA 116 includes parallel cores and is used to run the physics model of the weld puddle simulation described herein. The CPU 111 provides real-time welding input data to the CUDA 116 on the GPU 115. In one particular embodiment, the shader 117 is responsible for drawing and applying all of the visuals of the simulation. Bead and puddle visuals are driven by the state of a wexel displacement map which is described later herein. In accordance with an embodiment of the present invention, the physics model runs and updates at a rate of about 30 times per second.

Figure 12:
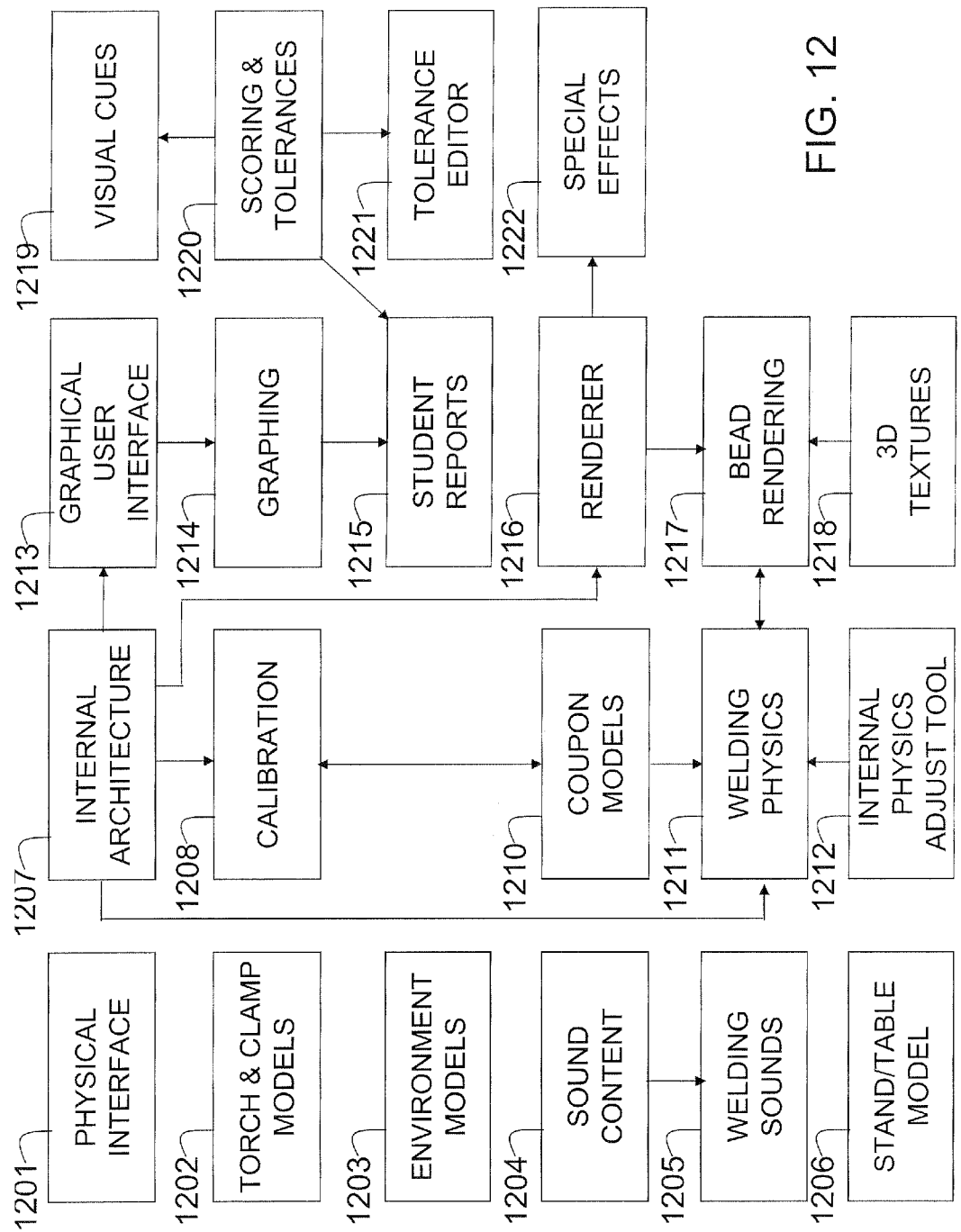
FIG. 12 illustrates an example embodiment of a functional block diagram of the simulator, according to the embodiments of the subject invention.

FIG. 12 illustrates an example embodiment of a functional block diagram of the simulator 10. The various functional blocks of the simulator 10 may be implemented largely via software instructions and modules running on the logic processor-based subsystem 110. The various functional blocks of the simulator 10 include a physical interface 1201, torch and clamp models 1202, environment models 1203, sound content functionality 1204, welding sounds 1205, stand/table model 1206, internal architecture functionality 1207, calibration functionality 1208, coupon models 1210, welding physics 1211, internal physics adjustment tool (tweaker) 1212, graphical user interface functionality 1213, graphing functionality 1214, student reports functionality 1215, renderer 1216, bead rendering 1217, 3D textures 1218, visual cues functionality 1219, scoring and tolerance functionality 1220, tolerance editor 1221, and special effects 1222.

The internal architecture functionality 1207 provides the higher level software logistics of the processes of the simulator 10 including, for example, loading files, holding information, managing threads, turning the physics model on, and triggering menus. The internal architecture functionality 1207 runs on the CPU 111, in accordance with an embodiment of the present invention. Certain real-time inputs to the logic processor-based subsystem 110 include arc location, gun position, face-mounted display device or helmet position, gun on/off state, and contact made state (yes/no).

During a simulated welding scenario, the graphing functionality 1214 gathers user performance parameters and provides the user performance parameters to the graphical user interface functionality 1213 for display in a graphical format (e.g., on the observer display device 150). Tracking information from the spatial tracker 120 feeds into the graphing functionality 1214. The graphing functionality 1214 includes a simple analysis module (SAM) and a whip/weave analysis module (WWAM). The SAM analyzes user welding parameters including welding travel angle, travel speed, weld angle, position, and tip to work by comparing the welding parameters to data stored in bead tables. The WWAM analyzes user whipping parameters including dime spacing, whip time, and puddle time. The WWAM also analyzes user weaving parameters including width of weave, weave spacing, and weave timing. The SAM and WWAM interpret raw input data (e.g., position and orientation data) into functionally usable data for graphing. For each parameter analyzed by the SAM and the WWAM, a tolerance window is defined by parameter limits around an optimum or ideal set point input into bead tables using the tolerance editor 1221, and scoring and tolerance functionality 1220 is performed.

The tolerance editor 1221 includes a weldometer which approximates material usage, electrical usage, and welding time. Furthermore, when certain parameters are out of tolerance, welding discontinuities (i.e., welding defects) may occur. The state of any welding discontinuities are processed by the graphing functionality 1214 and presented via the graphical user interface functionality 1213 in a graphical format. Such welding discontinuities include fillet size, poor bead placement, concave bead, excessive convexity, undercut, porosity, incomplete fusion, slag entrapment, and excess spatter. In accordance with an embodiment of the present invention, the level or amount of a discontinuity is dependent on how far away a particular user parameter is from the optimum or ideal set point.

Different parameter limits may be pre-defined for different types of users such as, for example, welding novices, welding experts, and persons at a trade show. The scoring and tolerance functionality 1220 provide number scores depending on how close to optimum (ideal) a user is for a particular parameter and depending on the level of discontinuities or defects present in the weld. Information from the scoring and tolerance functionality 1220 and from the graphics functionality 1214 may be used by the student reports functionality 1215 to create a performance report for an instructor and/or a student.

Visual cues functionality 1219 provide immediate feedback to the user by displaying overlaid colors and indicators on the face mounted display device 140 and/or the observer display device 150. Visual cues are provided for each of the welding parameters 151 including position, tip to work, weld angle, travel angle, and travel speed and visually indicate to the user if some aspect of the user's welding technique should be adjusted based on the predefined limits or tolerances. Visual cues may also be provided for whip/weave technique and weld bead "dime" spacing, for example.

In accordance with an embodiment of the present invention, simulation of a weld puddle or pool in virtual reality space is accomplished where the simulated weld puddle has real-time molten metal fluidity and heat dissipation characteristics. At the heart of the weld puddle simulation is the welding physics functionality 1211 (a.k.a., the physics model) which may be executed on the GPUs 115, in accordance with an embodiment of the present invention. The welding physics functionality employs a double displacement layer technique to accurately model dynamic fluidity/viscosity, solidity, heat gradient (heat absorption and dissipation), puddle wake, and bead shape, and is described in more detail herein with respect to FIGS. 14a-14c.

The welding physics functionality 1211 communicates with the bead rendering functionality 1217 to render a weld bead in all states from the heated molten state to the cooled solidified state. The bead rendering functionality 1217 uses information from the welding physics functionality 1211 (e.g., heat, fluidity, displacement, dime spacing) to accurately and realistically render a weld bead in virtual reality space in real-time. The 3D textures functionality 1218 provides texture maps to the bead rendering functionality 1217 to overlay additional textures (e.g., scorching, slag, grain) onto the simulated weld bead. The renderer functionality 1216 is used to render various non-puddle specific characteristics using information from the special effects module 1222 including sparks, spatter, smoke, arc glow, fumes, and certain discontinuities such as, for example, undercut and porosity.

The internal physics adjustment tool 1212 is a tweaking tool that allows various welding physics parameters to be defined, updated, and modified for the various welding processes. In accordance with an embodiment of the present invention, the internal physics adjustment tool 1212 runs on the CPU 111, and the adjusted or updated parameters are downloaded to the GPUs 115. The types of parameters that may be adjusted via the internal physics adjustment tool 1212 include parameters related to welding coupons, process parameters that allow a process to be changed without having to reset a welding coupon (allows for doing a second pass), various global parameters that can be changed without resetting the entire simulation, and other various parameters.

FIG. 13 is a flow chart of an embodiment of a method 1300 of training using the virtual reality training simulator 10. In step 1310, move a mock welding tool with respect to a welding coupon in accordance with a welding technique. In step 1320, track position and orientation of the mock welding tool in three-dimensional space using a virtual reality system. In step 1330, view a display of the virtual reality welding system showing a real-time virtual reality simulation of the mock welding tool and the welding coupon in a virtual reality space as the simulated mock welding tool deposits a simulated weld bead material onto at least one simulated surface of the simulated welding coupon by forming a simulated weld puddle in the vicinity of a simulated arc emitting from said simulated mock welding tool. In step 1340, view on the display, real-time molten metal fluidity and heat dissipation characteristics of the simulated weld puddle. In step 1350, modify in real-time, at least one aspect of the welding technique in response to viewing the real-time molten metal fluidity and heat dissipation characteristics of the simulated weld puddle.

The method 1300 illustrates how a user is able to view a weld puddle in virtual reality space and modify his welding technique in response to viewing various characteristics of the simulated weld puddle, including real-time molten metal fluidity (e.g., viscosity) and heat dissipation. The user may also view and respond to other characteristics including real-time puddle wake and dime spacing. Viewing and responding to characteristics of the weld puddle is how many welding operations are actually performed in the real world. The double displacement layer modeling of the welding physics functionality 1211 run on the GPUs 115 allows for such real-time molten metal fluidity and heat dissipation characteristics to be accurately modeled and represented to the user. For example, heat dissipation determines solidification time (i.e., how much time it takes for a wexel to completely solidify).

Furthermore, a user may make a second pass over the weld bead material using the same or a different (e.g., a second) mock welding tool, welding electrode and/or welding process. In such a second pass scenario, the simulation shows the simulated mock welding tool, the welding coupon, and the original simulated weld bead material in virtual reality space as the simulated mock welding tool deposits a second simulated weld bead material merging with the first simulated weld bead material by forming a second simulated weld puddle in the vicinity of a simulated arc emitting from the simulated mock welding tool. Additional subsequent passes using the same or different welding tools or processes may be made in a similar manner. In any second or subsequent pass, the previous weld bead material is merged with the new weld bead material being deposited as a new weld puddle is formed in virtual reality space from the combination of any of the previous weld bead material, the new weld bead material, and possibly the underlying coupon material in accordance with certain embodiments of the present invention. Such subsequent passes may be performed to repair a weld bead formed by a previous pass, for example, or may include a heat pass and one or more gap closing passes after a root pass as is done in pipe welding. In accordance with various embodiments of the present invention, weld bead material may be simulated to include mild steel, stainless steel, and aluminum.

Engine for Modeling

FIGS. 14a-14b illustrate the concept of a welding element (wexel) displacement map 1420, in accordance with an embodiment of the present invention. FIG. 14a shows a side view of a flat welding coupon 1400 having a flat top surface 1410. The welding coupon 1400 exists in the real world as, for example, a plastic part, and also exists in virtual reality space as a simulated welding coupon. FIG. 14b shows a representation of the top surface 1410 of the simulated welding coupon 1400 broken up into a grid or array of welding elements, termed "wexels" forming a wexel map 1420. Each wexel (e.g., wexel 1421) defines a small portion of the surface 1410 of the welding coupon. The wexel map defines the surface resolution. Changeable channel parameter values are assigned to each wexel, allowing values of each wexel to dynamically change in real-time in virtual reality weld space during a simulated welding process. The changeable channel parameter values correspond to the channels Puddle (molten metal fluidity/viscosity displacement), Heat (heat absorption/dissipation), Displacement (solid displacement), and Extra (various extra states, e.g., slag, grain, scorching, virgin metal). These changeable channels are referred to herein as PHED for Puddle, Heat, Extra, and Displacement, respectively.

FIG. 15 illustrates an example embodiment of a coupon space and a weld space of the flat welding coupon 1400 of FIG. 14 simulated in the simulator 10 of FIGS. 1 and 2. Points O, X, Y, and Z define the local 3D coupon space. In general, each coupon type defines the mapping from 3D coupon space to 2D virtual reality weld space. The wexel map 1420 of FIG. 14 is a two-dimensional array of values that map to weld space in virtual reality. A user is to weld from point B to point E as shown in FIG. 15. A trajectory line from point B to point E is shown in both 3D coupon space and 2D weld space in FIG. 15.

Each type of coupon defines the direction of displacement for each location in the wexel map. For the flat welding coupon of FIG. 15, the direction of displacement is the same at all locations in the wexel map (i.e., in the Z-direction). The texture coordinates of the wexel map are shown as S, T (sometimes called U, V) in both 3D coupon space and 2D weld space, in order to clarify the mapping. The wexel map is mapped to and represents the rectangular surface 1410 of the welding coupon 1400.

Figure 16:
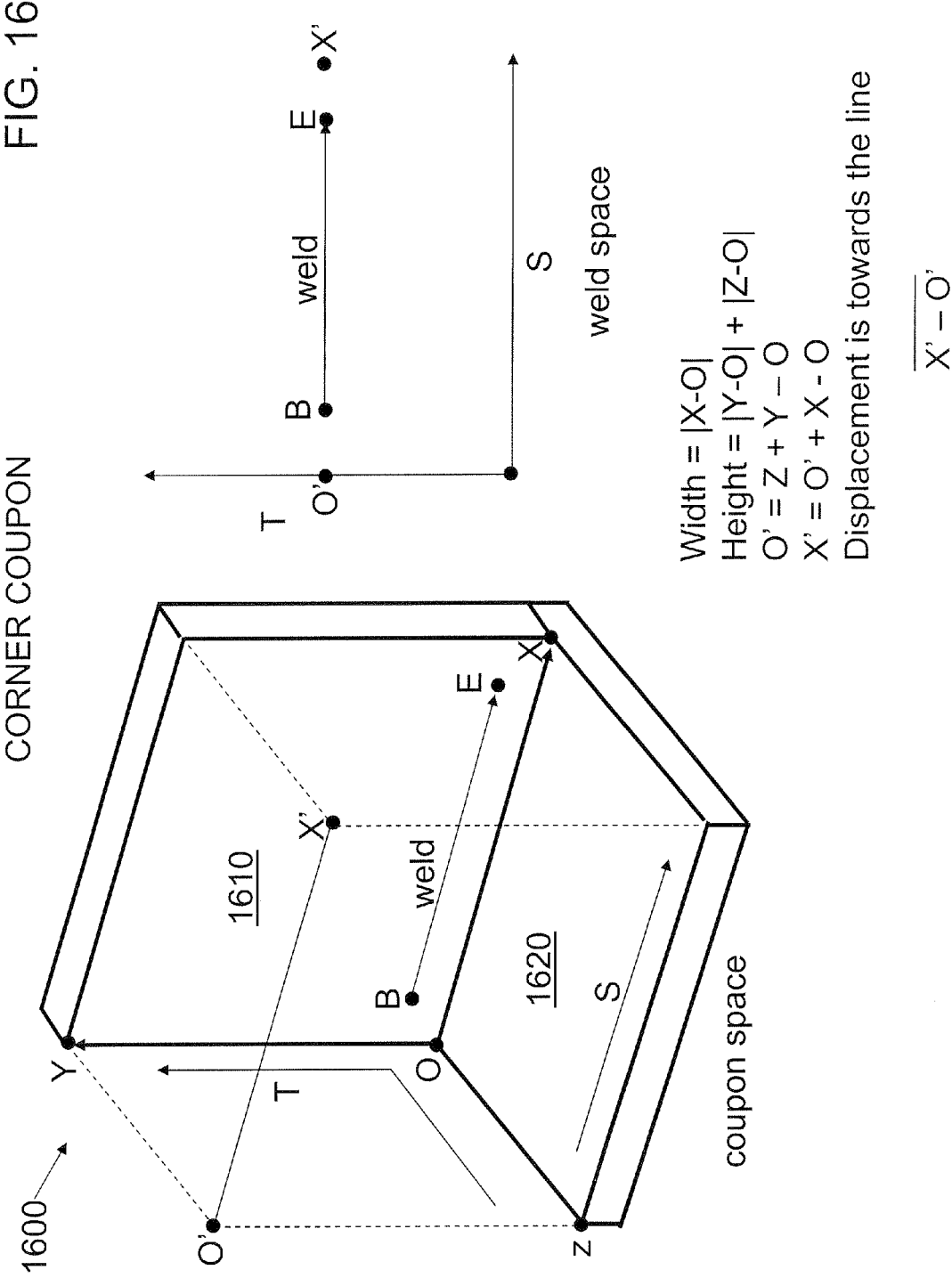
FIG. 16 illustrates an example embodiment of a coupon space and a weld space of a corner welding coupon simulated in the simulator, according to the embodiments of the subject invention.

FIG. 16 illustrates an example embodiment of a coupon space and a weld space of a corner welding coupon 1600 simulated in the simulator 10. The corner welding coupon 1600 has two surfaces 1610 and 1620 in 3D coupon space that are mapped to 2D weld space as shown in FIG. 16. Again, points O, X, Y, and Z define the local 3D coupon space. The texture coordinates of the wexel map are shown as S, T in both 3D coupon space and 2D weld space, in order to clarify the mapping. A user is to weld from point B to point E as shown in FIG. 16. A trajectory line from point B to point E is shown in both 3D coupon space and 2D weld space in FIG. 16. However, the direction of displacement is towards the line X'-O' as shown in the 3D coupon space, towards the opposite corner.

Figure 18:
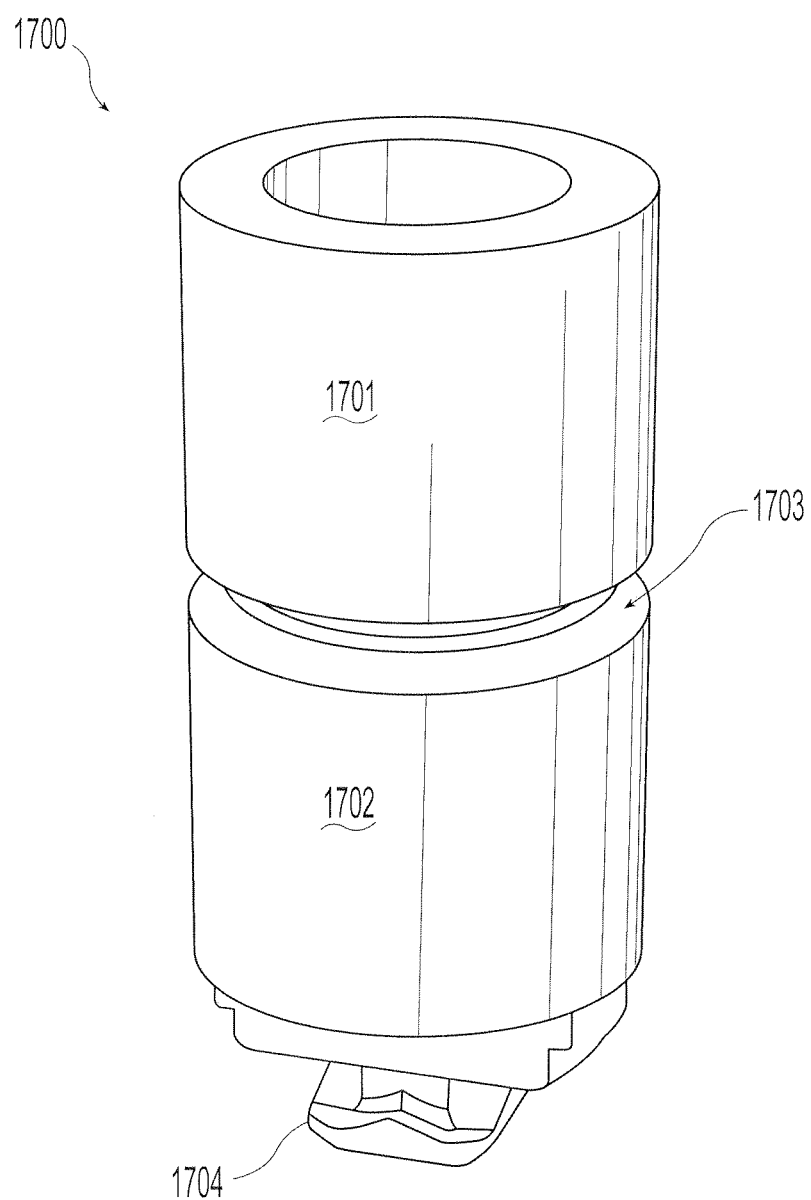
FIG. 18 illustrates an example embodiment of the pipe welding coupon, according to the embodiments of the subject invention.

FIG. 17 illustrates an example embodiment of a coupon space and a weld space of a pipe welding coupon 1700 simulated in the simulator 10. The pipe welding coupon 1700 has a curved surface 1710 in 3D coupon space that is mapped to 2D weld space. Points O, X, Y, and Z once again define the local 3D coupon space. The texture coordinates of the wexel map are shown as S, T in both 3D coupon space and 2D weld space, in order to clarify the mapping. An end user 12 is to weld from point B to point E along a curved trajectory as shown in FIG. 17. A trajectory curve and line from point B to point E is shown in 3D coupon space and 2D weld space, respectively. The direction of displacement is away from the line Y-O (i.e., away from the center of the pipe). FIG. 18 illustrates an example embodiment of the pipe welding coupon 1700 of FIG. 17. The pipe welding coupon 1700 is made of a non-ferric, non-conductive plastic and simulates two pipe pieces 1701 and 1702 coming together to form a root joint 1703. An attachment piece 1704 for attaching to the arm 173 of the stand 170 is also shown.

In a similar manner that a texture map may be mapped to a rectangular surface area of a geometry, a weldable wexel map may be mapped to a rectangular surface of a welding coupon. Each element of the weldable map is termed a wexel in the same sense that each element of a picture is termed a pixel (a contraction of picture element). A pixel contains channels of information that define a color (e.g., red, green, blue, etc.). A wexel contains channels of information (e.g., P, H, E, D) that define a weldable surface in virtual reality space.

In accordance with an embodiment of the present invention, the format of a wexel is summarized as channels PHED (Puddle, Heat, Extra, Displacement) which contains four floating point numbers. The Extra channel is treated as a set of bits which store logical information about the wexel such as, for example, whether or not there is any slag at the wexel location. The Puddle channel stores a displacement value for any liquefied metal at the wexel location. The Displacement channel stores a displacement value for the solidified metal at the wexel location. The Heat channel stores a value giving the magnitude of heat at the wexel location. In this way, the weldable part of the coupon can show displacement due to a welded bead, a shimmering surface "puddle" due to liquid metal, color due to heat, etc. All of these effects are achieved by the vertex and pixel shaders applied to the weldable surface.

In accordance with an embodiment of the present invention, a displacement map and a particle system are used where the particles can interact with each other and collide with the displacement map. The particles are virtual dynamic fluid particles and provide the liquid behavior of the weld puddle but are not rendered directly (i.e., are not visually seen directly). Instead, only the particle effects on the displacement map are visually seen. Heat input to a wexel affects the movement of nearby particles. There are two types of displacement involved in simulating a welding puddle which include Puddle and Displacement. Puddle is "temporary" and only lasts as long as there are particles and heat present. Displacement is "permanent". Puddle displacement is the liquid metal of the weld which changes rapidly (e.g., shimmers) and can be thought of as being "on top" of the Displacement. The particles overlay a portion of a virtual surface displacement map (i.e., a wexel map). The Displacement represents the permanent solid metal including both the initial base metal and the weld bead that has solidified.

In accordance with an embodiment of the present invention, the simulated welding process in virtual reality space works as follows: Particles stream from the emitter (emitter of the simulated mock welding tool 160) in a thin cone. The particles make first contact with the surface of the simulated welding coupon where the surface is defined by a wexel map. The particles interact with each other and the wexel map and build up in real-time. More heat is added the nearer a wexel is to the emitter. Heat is modeled in dependence on distance from the arc point and the amount of time that heat is input from the arc. Certain visuals (e.g., color, etc.) are driven by the heat. A weld puddle is drawn or rendered in virtual reality space for wexels having enough heat. Wherever it is hot enough, the wexel map liquefies, causing the Puddle displacement to "raise up" for those wexel locations. Puddle displacement is determined by sampling the "highest" particles at each wexel location. As the emitter moves on along the weld trajectory, the wexel locations left behind cool. Heat is removed from a wexel location at a particular rate. When a cooling threshold is reached, the wexel map solidifies. As such, the Puddle displacement is gradually converted to Displacement (i.e., a solidified bead). Displacement added is equivalent to Puddle removed such that the overall height does not change. Particle lifetimes are tweaked or adjusted to persist until solidification is complete. Certain particle properties that are modeled in the simulator 10 include attraction/repulsion, velocity (related to heat), dampening (related to heat dissipation), direction (related to gravity).

Figure 19A:
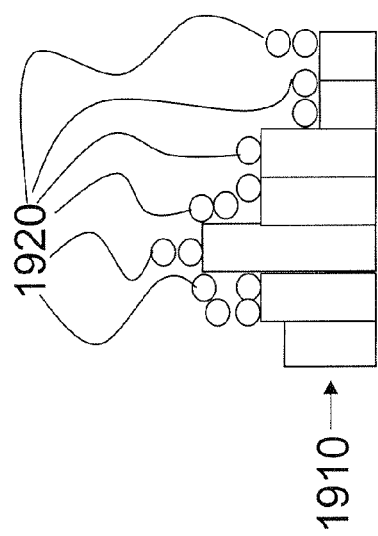
FIG. 19a-19c illustrate an example embodiment of the concept of a dual-displacement puddle model of the simulator, according to the embodiments of the subject invention.
Figure 19B:
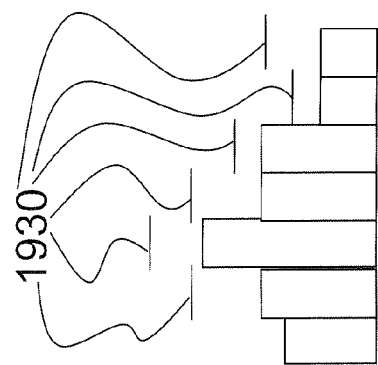
Figure 19C:
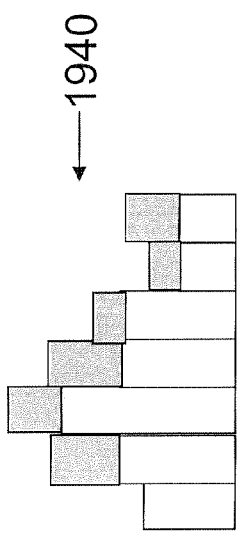

FIGS. 19a-19c illustrate an example embodiment of the concept of a dual-displacement (displacement and particles) puddle model of the simulator 10. Welding coupons are simulated in virtual reality space having at least one surface. The surfaces of the welding coupon are simulated in virtual reality space as a double displacement layer including a solid displacement layer and a puddle displacement layer. The puddle displacement layer is capable of modifying the solid displacement layer.

As described herein, "puddle" is defined by an area of the wexel map where the Puddle value has been raised up by the presence of particles. The sampling process is represented in FIGS. 19a-19c. A section of a wexel map is shown having seven adjacent wexels. The current Displacement values are represented by un-shaded rectangular bars 1910 of a given height (i.e., a given displacement for each wexel). In FIG. 19a, the particles 1920 are shown as round un-shaded dots colliding with the current Displacement levels and are piled up. In FIG. 19b, the "highest" particle heights 1930 are sampled at each wexel location. In FIG. 19c, the shaded rectangles 1940 show how much Puddle has been added on top of the Displacement as a result of the particles. The weld puddle height is not instantly set to the sampled values since Puddle is added at a particular liquification rate based on Heat. Although not shown in FIGS. 19a-19c, it is possible to visualize the solidification process as the Puddle (shaded rectangles) gradually shrink and the Displacement (un-shaded rectangles) gradually grow from below to exactly take the place of the Puddle. In this manner, real-time molten metal fluidity characteristics are accurately simulated. As a user practices a particular welding process, the user is able to observe the molten metal fluidity characteristics and the heat dissipation characteristics of the weld puddle in real-time in virtual reality space and use this information to adjust or maintain his welding technique.

The number of wexels representing the surface of a welding coupon is fixed. Furthermore, the puddle particles that are generated by the simulation to model fluidity are temporary, as described herein. Therefore, once an initial puddle is generated in virtual reality space during a simulated welding process using the simulator 10, the number of wexels plus puddle particles tends to remain relatively constant. This is because the number of wexels that are being processed is fixed and the number of puddle particles that exist and are being processed during the welding process tend to remain relatively constant because puddle particles are being created and "destroyed" at a similar rate (i.e., the puddle particles are temporary). Therefore, the processing load of the logic processor-based subsystem 110 remains relatively constant during a simulated welding session.

In accordance with an alternate embodiment of the present invention, puddle particles may be generated within or below the surface of the welding coupon. In such an embodiment, displacement may be modeled as being positive or negative with respect to the original surface displacement of a virgin (i.e., un-welded) coupon. In this manner, puddle particles may not only build up on the surface of a welding coupon, but may also penetrate the welding coupon. However, the number of wexels is still fixed and the puddle particles being created and destroyed is still relatively constant.

In accordance with alternate embodiments of the present invention, instead of modeling particles, a wexel displacement map may be provided having more channels to model the fluidity of the puddle. Or, instead of modeling particles, a dense voxel map may be modeled. Or, instead of a wexel map, only particles may be modeled which are sampled and never go away. Such alternative embodiments may not provide a relatively constant processing load for the system, however.

Furthermore, in accordance with an embodiment of the present invention, blowthrough or a keyhole is simulated by taking material away. For example, if a user keeps an arc in the same location for too long, in the real world, the material would burn away causing a hole. Such real-world burn-through is simulated in the simulator 10 by wexel decimation techniques. If the amount of heat absorbed by a wexel is determined to be too high by the simulator 10, that wexel may be flagged or designated as being burned away and rendered as such (e.g., rendered as a hole). Subsequently, however, wexel re-constitution may occur for certain welding process (e.g., pipe welding) where material is added back after being initially burned away. In general, the simulator 10 simulates wexel decimation (taking material away) and wexel reconstitution (i.e., adding material back).

Furthermore, removing material in root-pass welding is properly simulated in the simulator 10. For example, in the real world, grinding of the root pass may be performed prior to subsequent welding passes. Similarly, simulator 10 may simulate a grinding pass that removes material from the virtual weld joint. It will be appreciated that the material removed is modeled as a negative displacement on the wexel map. That is to say that the grinding pass removes material that is modeled by the simulator 10 resulting in an altered bead contour. Simulation of the grinding pass may be automatic, which is to say that the simulator 10 removes a predetermined thickness of material, which may be respective to the surface of the root pass weld bead. In an alternate embodiment, an actual grinding tool, or grinder, may be simulated that turns on and off by activation of the mock welding tool 160 or another input device. It is noted that the grinding tool may be simulated to resemble a real world grinder. In this embodiment, the user maneuvers the grinding tool along the root pass to remove material responsive to the movement thereof. It will be understood that the user may be allowed to remove too much material. In a manner similar to that described above, holes or keyholes, or other defects (described above) may result if the user "grinds away" to much material. Still, hard limits or stops may be implemented, i.e. programmed, to prevent the user from removing to much material or indicate when too much material is being removed.

In addition to the non-visible "puddle" particles described herein, the simulator 10 also uses three other types of visible particles to represent Arc, Flame, and Spark effects, in accordance with an embodiment of the present invention. These types of particles do not interact with other particles of any type but interact only with the displacement map. While these particles do collide with the simulated weld surface, they do not interact with each other. Only Puddle particles interact with each other, in accordance with an embodiment of the present invention. The physics of the Spark particles is setup such that the Spark particles bounce around and are rendered as glowing dots in virtual reality space.

The physics of the Arc particles is setup such that the Arc particles hit the surface of the simulated coupon or weld bead and stay for a while. The Arc particles are rendered as larger dim bluish-white spots in virtual reality space. It takes many such spots superimposed to form any sort of visual image. The end result is a white glowing nimbus with blue edges.

The physics of the Flame particles is modeled to slowly raise upward. The Flame particles are rendered as medium sized dim red-yellow spots. It takes many such spots superimposed to form any sort of visual image. The end result is blobs of orange-red flames with red edges raising upward and fading out. Other types of non-puddle particles may be implemented in the simulator 10, in accordance with other embodiments of the present invention. For example, smoke particles may be modeled and simulated in a similar manner to flame particles.

The final steps in the simulated visualization are handled by the vertex and pixel shaders provided by the shaders 117 of the GPUs 115. The vertex and pixel shaders apply Puddle and Displacement, as well as surface colors and reflectivity altered due to heat, etc. The Extra (E) channel of the PHED wexel format, as discussed earlier herein, contains all of the extra information used per wexel. In accordance with an embodiment of the present invention, the extra information includes a non virgin bit (true=bead, false=virgin steel), a slag bit, an undercut value (amount of undercut at this wexel where zero equals no undercut), a porosity value (amount of porosity at this wexel where zero equals no porosity), and a bead wake value which encodes the time at which the bead solidifies. There are a set of image maps associated with different coupon visuals including virgin steel, slag, bead, and porosity. These image maps are used both for bump mapping and texture mapping. The amount of blending of these image maps is controlled by the various flags and values described herein.

A bead wake effect is achieved using a 1D image map and a per wexel bead wake value that encodes the time at which a given bit of bead is solidified. Once a hot puddle wexel location is no longer hot enough to be called "puddle", a time is saved at that location and is called "bead wake". The end result is that the shader code is able to use the 1D texture map to draw the "ripples" that give a bead its unique appearance which portrays the direction in which the bead was laid down. In accordance with an alternative embodiment of the present invention, the simulator 10 is capable of simulating, in virtual reality space, and displaying a weld bead having a real-time weld bead wake characteristic resulting from a real-time fluidity-to-solidification transition of the simulated weld puddle, as the simulated weld puddle is moved along a weld trajectory.

In accordance with an alternative embodiment of the present invention, the simulator 10 is capable of teaching a user how to troubleshoot a welding machine. For example, a troubleshooting mode of the system may train a user to make sure he sets up the system correctly (e.g., correct gas flow rate, correct power cord connected, etc.) In accordance with another alternate embodiment of the present invention, the simulator 10 is capable of recording and playing back a welding session (or at least a portion of a welding session, for example, N frames). A track ball may be provided to scroll through frames of video, allowing a user or instructor to critique a welding session. Playback may be provided at selectable speeds as well (e.g., full speed, half speed, quarter speed). In accordance with an embodiment of the present invention, a split-screen playback may be provided, allowing two welding sessions to be viewed side-by-side, for example, on the observer display device 150. For example, a "good" welding session may be viewed next to a "poor" welding session for comparison purposes.

In summary, disclosed is a real-time virtual reality welding system including a programmable processor-based subsystem, a spatial tracker operatively connected to the programmable processor-based subsystem, at least one mock welding tool capable of being spatially tracked by the spatial tracker, and at least one display device operatively connected to the programmable processor-based subsystem. The system is capable of simulating, in virtual reality space, a weld puddle having real-time molten metal fluidity and heat dissipation characteristics. The system is further capable of displaying the simulated weld puddle on the display device in real-time.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

The invention claimed is:

1. A simulator for facilitating virtual welding activity, comprising;
    a logic processor based subsystem operable to execute coded instructions for generating an interactive welding environment that emulates welding activity on a section of virtual pipe having at least one virtual weld joint wherein the interactive welding environment models fluidity of a weld puddle responsive to performing the virtual welding activity in real-time;
    displaying means operatively connected to the logic processor based subsystem for visually depicting the interactive welding environment, wherein said displaying means depicts the section of virtual pipe and further wherein said displaying means depicts fluidity and heat dissipation characteristics of the weld puddle in real-time;
    an input device for performing virtual welding activity on the at least one virtual weld joint in real time; and,
    one or more sensors adapted to track movement of the input device in real time for communicating data about the movement of the input device to the logic processor based subsystem, and wherein
    said real-time fluidity and heat dissipation characteristics of said simulated weld puddle are illustrated on a texture map comprising channels of information which comprise at least
        a first channel which stores a displacement value for any liquefied metal at the wexel location;
        a second channel which stores a value giving the magnitude of heat at the wexel location;
        a third channel which stores a displacement value for a solidified metal at the wexel location; and
        a fourth channel which stores logical information about the wexel, including a representation regarding slag at the wexel location, and further wherein
    at least one additional property is modeled, including a directional effect of gravity.

2. The simulator as defined in claim 1, wherein
    the logic processor based subsystem emulates welding activity on a section of virtual pipe in a first and at least a second substantially different welding position.

3. The simulator as defined in claim 2, wherein
    the logic processor based subsystem emulates welding activity on a section of virtual pipe in 2G, 5G and 6G positions.

4. The simulator as defined in claim 1, further comprising:
a welding coupon defining an exterior surface that includes a weld joint, wherein the welding coupon corresponds to a contour of the section of virtual pipe; and,
wherein the input device comprises a mock electrode holder including a mock electrode tip adapted to engage the exterior surface of the welding coupon for use as a guide in performing virtual welding activity.

5. The simulator as defined in claim 4, wherein
the mock electrode tip moves with respect the mock electrode holder for emulating consumption of an electrode during the virtual welding activity.

6. The simulator as defined in claim 4, wherein
the mock electrode tip is constructed from material that simulates tactile resistance of a welding process when engaged with the weld joint of the welding coupon.

7. The simulator as defined in claim 1, wherein
the interactive welding environment generates occlusions formed in a virtual weld puddle responsive to performing the virtual welding activity.

8. The simulator as defined in claim 1, wherein
the logic processor based subsystem emulates effects of gravity on the weld puddle.

9. The simulator as defined in claim 2, wherein
the interactive welding environment, effects of gravity are emulated differently for the first welding position with respect to the at least a second substantially different welding position.

10. A simulator for facilitating virtual welding activity, comprising:
a logic processor based subsystem operable to execute coded instructions for generating an interactive welding environment that simulates welding activity on a virtual weldment having at least one open root weld joint wherein the interactive welding environment models fluidity of a weld puddle responsive to performing the virtual welding activity in real-time;
a personalized display operatively connected to the logic processor based subsystem for visually depicting virtual welding activity within the interactive welding environment and further wherein said display depicts fluidity and heat dissipation characteristics of the weld puddle in real-time;
a mock welding tool for performing the virtual welding activity on the at least one open root weld joint in real time; and,
a spatial tracker adapted to track movement of the mock welding tool in real time, and wherein
said real-time fluidity and heat dissipation characteristics of said simulated weld puddle are illustrated on a texture map comprising channels of information which comprise at least
a first channel which stores a displacement value for any liquefied metal at the wexel location;
a second channel which stores a value giving the magnitude of heat at the wexel location;
a third channel which stores a displacement value for a solidified metal at the wexel location; and
a fourth channel which stores logical information about the wexel, including a representation regarding slag at the wexel location, and further wherein
at least one additional property is modeled, including a directional effect of gravity.

11. The simulator as defined in claim 10, wherein
the interactive welding environment simulates welding activity on the virtual weldment in a first vertical position and a second substantially horizontal position.

12. The simulator as defined in claim 10, further comprises:
a welding coupon that matches the virtual weldment;
a stand for receiving the welding coupon that is adjustable between first and at least a second substantially different position.

13. The simulator as defined in claim 10, further comprises:
a welding coupon that matches the virtual weldment;
a stand for receiving the welding coupon that is adjustable between first and at least a second substantially different vertical position; and,
wherein the interactive welding environment simulates welding activity on the virtual weldment in an overhead position.

14. The simulator as defined in claim 10, wherein
the interactive welding environment simulates a weld puddle having viscosity that changes responsive to movement of the mock welding tool.

15. The simulator as defined in claim 14, wherein
the interactive welding environment simulates welding with first and second different types of welding electrodes; and,
wherein the interactive welding environment simulates a weld puddle having viscosity substantially different for the first welding electrode with respect to the second welding electrode.

16. The simulator as defined in claim 10, wherein
the interactive welding environment dynamically models molten fluidity of a virtual weld puddle in conjunction with heat dissipation characteristics of the virtual weld puddle.

17. The simulator as defined in claim 10, wherein
the personalized display depicts stereoscopic images of the virtual welding activity for simulating depth perception.

18. The simulator as defined in claim 10, wherein
the mock welding tool resembles manual welding electrode holder.

19. The simulator as defined in claim 10, further comprising:
a welding user interface operatively connected to the logic processor based subsystem for operating the simulator, wherein the welding user interface resembles a control panel of a real-world power source.

20. A simulator for facilitating virtual welding activity, comprising:
a logic processor based subsystem operable to execute coded instructions for generating an interactive welding environment that emulates welding activity on a section of virtual pipe having a virtual weld joint, wherein the interactive welding environment models fluidity of a weld puddle, including a varying directional effect of gravity on the weld puddle as the weld puddle moves around the virtual weld joint, responsive to performing the virtual welding activity in real time;
said subsystem comprising channels of information in which at least one channel stores a displacement value for any liquefied metal at a specific location and at least one other channel which stores a magnitude of heat at said specific location, and wherein at least one additional channel represents a total of an initial base metal plus said displacement value for liquefied metal which has solidified at said specific location when said magnitude of heat falls below a cooling threshold;
displaying means operatively connected to the logic processor based subsystem for visually depicting the interactive welding environment, wherein said displaying means depicts the section of virtual pipe and the fluidity of the weld puddle, including the directional effect of gravity, in real time;
an input device for performing virtual welding activity on the virtual weld joint in real time; and
one or more sensors adapted to track movement of the input device in real time for communicating data about the movement of the input device to the logic processor based subsystem.

21. The simulator as defined in claim 20, wherein the logic processor based subsystem emulates welding activity on a section of virtual pipe in a first and at least a second substantially different welding position.

22. The simulator as defined in claim 21, wherein the logic processor based subsystem emulates welding activity on a section of virtual pipe in 2G, 5G and 6G positions.

23. The simulator as defined in claim 20, further comprising:
a welding coupon defining an exterior surface that includes a weld joint, wherein the welding coupon corresponds to a contour of the section of virtual pipe; and,
wherein the input device comprises a mock electrode holder including a mock electrode tip adapted to engage the exterior surface of the welding coupon for use as a guide in performing virtual welding activity.

24. The simulator as defined in claim 23, wherein the mock electrode tip moves with respect the mock electrode holder for emulating consumption of an electrode during the virtual welding activity.

25. The simulator as defined in claim 23, wherein the mock electrode tip is constructed from material that simulates tactile resistance of a welding process when engaged with the weld joint of the welding coupon.

26. The simulator as defined in claim 20, wherein the interactive welding environment generates occlusions formed in a virtual weld puddle responsive to performing the virtual welding activity.

27. The simulator as defined in claim 21, wherein the interactive welding environment, effects of gravity are emulated differently for the first welding position with respect to the at least a second substantially different welding position.

28. A simulator for facilitating virtual welding activity, comprising:
a logic processor based subsystem operable to execute coded instructions for generating an interactive welding environment that simulates welding activity on a virtual weldment having an open root joint, wherein the interactive welding environment models the fluidic modification of root pass weld material in the open root joint and the adding of weld material, in real time, responsive to performing one or more subsequent heat passes as part of the virtual welding activity;
said subsystem comprising channels of information in which at least one channel stores a displacement value for any liquefied metal at a specific location and at least one other channel which stores a magnitude of heat at said specific location, and wherein at least one additional channel represents a total of an initial base metal plus said displacement value for liquefied metal which has solidified at said specific location when said magnitude of heat falls below a cooling threshold;
a personalized display operatively connected to the logic processor based subsystem for visually depicting virtual welding activity within the interactive welding environment in real time;
a mock welding tool for performing the virtual welding activity on the open root joint in real time; and
a spatial tracker adapted to track movement of the mock welding tool in real time.

29. The simulator as defined in claim 28, wherein the interactive welding environment simulates welding activity on the virtual weldment in a first vertical position and a second substantially horizontal position.

30. The simulator as defined in claim 28, further comprises:
a welding coupon that matches the virtual weldment;
a stand for receiving the welding coupon that is adjustable between first and at least a second substantially different position.

31. The simulator as defined in claim 28, further comprises:
a welding coupon that matches the virtual weldment;
a stand for receiving the welding coupon that is adjustable between first and at least a second substantially different vertical position; and,
wherein the interactive welding environment simulates welding activity on the virtual weldment in an overhead position.

32. The simulator as defined in claim 28, wherein the interactive welding environment simulates a weld puddle having viscosity that changes responsive to movement of the mock welding tool.

33. The simulator as defined in claim 32, wherein the interactive welding environment simulates welding with first and second different types of welding electrodes; and,
wherein the interactive welding environment simulates a weld puddle having viscosity substantially different for the first welding electrode with respect to the second welding electrode.

34. The simulator as defined in claim 28, wherein the interactive welding environment dynamically models molten fluidity of a virtual weld puddle in conjunction with heat dissipation characteristics of the virtual weld puddle.

35. The simulator as defined in claim 28, wherein the personalized display depicts stereoscopic images of the virtual welding activity for simulating depth perception.

36. The simulator as defined in claim 28, wherein the mock welding tool resembles manual welding electrode holder.

37. The simulator as defined in claim 28, further comprising:
a welding user interface operatively connected to the logic processor based subsystem for operating the simulator, wherein the welding user interface resembles a control panel of a real-world power source.

38. A simulator for facilitating virtual welding activity, comprising:
a logic processor based subsystem operable to execute coded instructions for generating an interactive welding environment that simulates welding activity on a virtual weldment having an open root joint, wherein the interactive welding environment models the removal of weld material from a simulated root pass weld in the open root joint, in real time, responsive to performing one or more virtual grinding passes on the root pass weld as part of the virtual welding activity;
said subsystem comprising channels of information in which at least one channel stores a negative displacement value for any liquefied metal at a specific location and at least one other channel which stores a magnitude of heat at said specific location, and wherein at least one additional channel represents a wexel decimation displacement value at said specific location when said magnitude of heat is above a threshold value;
a personalized display operatively connected to the logic processor based subsystem for visually depicting virtual welding activity within the interactive welding environment in real time;
a mock welding tool for performing the one or more virtual grinding passes on the root pass weld in real time; and
a spatial tracker adapted to track movement of the mock welding tool in real time.

39. The simulator as defined in claim 38, wherein
the interactive welding environment simulates welding activity on the virtual weldment in a first vertical position and a second substantially horizontal position.

40. The simulator as defined in claim 38, further comprises:
a welding coupon that matches the virtual weldment;
a stand for receiving the welding coupon that is adjustable between first and at least a second substantially different position.

41. The simulator as defined in claim 38, further comprises:
a welding coupon that matches the virtual weldment;
a stand for receiving the welding coupon that is adjustable between first and at least a second substantially different vertical position; and,
wherein the interactive welding environment simulates welding activity on the virtual weldment in an overhead position.

42. The simulator as defined in claim 38, wherein
the interactive welding environment simulates a weld puddle having viscosity that changes responsive to movement of the mock welding tool as a negative displacement on a wexel map.

43. The simulator as defined in claim 42, wherein
the interactive welding environment simulates welding with first and second different types of welding electrodes; and,
wherein the interactive welding environment simulates a weld puddle having viscosity substantially different for the first welding electrode with respect to the second welding electrode.

44. The simulator as defined in claim 38, wherein
the interactive welding environment dynamically models negative displacement of a virtual weld puddle in conjunction with heat dissipation characteristics of the virtual weld puddle.

45. The simulator as defined in claim 38, wherein
the personalized display depicts stereoscopic images of the virtual welding activity for simulating depth perception.

46. The simulator as defined in claim 38, wherein
the mock welding tool resembles manual welding electrode holder.

47. The simulator as defined in claim 38, further comprising:
a welding user interface operatively connected to the logic processor based subsystem for operating the simulator, wherein the welding user interface resembles a control panel of a real-world power source.

48. A virtual reality welding system comprising:
a programmable processor-based subsystem;
a spatial tracker operatively connected to said programmable processor-based subsystem;
at least one mock welding tool configured to be spatially tracked by said spatial tracker; and
at least one display device operatively connected to said programmable processor-based subsystem; and wherein
said system simulates, in a virtual reality space, a weld puddle having real-time molten metal fluidity and heat dissipation characteristics, and display said simulated weld puddle on said at least one display device in real-time; and wherein
said weld puddle is represented in the virtual reality space by a displacement map and a particle system in which particles in said particle system interact and collide with said displacement map, each of said particles being virtual dynamic particles and provide the liquid behavior of said weld puddle, and further wherein
a texture map is created in which each element of said map is a wexel comprised of at least four channels of information which defines a weldable surface in said virtual reality space, each channel containing at least four floating point numbers in which said channels comprise:
a first channel which stores a displacement value for any liquefied metal at the wexel location;
a second channel which stores a value giving the magnitude of heat at the wexel location;
a third channel which stores a displacement value for a solidified metal at the wexel location; and
a fourth channel which stores logical information about the wexel, including a representation regarding slag at the wexel location and further wherein
at least one additional property is modeled selected from the group consisting of a directional effect of gravity, open root welding, and virtual grinding passes on a root pass weld.

49. The system of claim 48 wherein
said particles stream from an emitter and make first contact with a surface of a simulated welding coupon where said surface is defined by said wexel map; and further wherein
said particles interact with each other and said wexel map and build up in real-time; and further wherein
more heat is added the nearer said wexel is to the emitter.

50. The system of claim 49 wherein
heat is modeled in dependence on a distance from an arc point and an amount of time that said heat is input from said arc, and further wherein
visuals are driven by said heat wherein said weld puddle is rendered in virtual reality space for wexels having a sufficient quantity of heat.

51. The system of claim 50 wherein
said wexel map liquefies when it reaches a heating threshold, thereby causing said first channel to increase for said liquefied wexel map locations; and further wherein
said wexel map solidifies when said liquefied wexel map locations go below a cooling threshold and a value of said first channel is converted into a value for said third channel.

* * * * *